US011956324B2

(12) United States Patent
Alessi et al.

(10) Patent No.: US 11,956,324 B2
(45) Date of Patent: Apr. 9, 2024

(54) SENSOR DEVICE, SYSTEM AND METHOD

(71) Applicant: STMICROELECTRONICS S.r.l., Agrate Brianza (IT)

(72) Inventors: Enrico Rosario Alessi, Catania (IT); Fabio Passaniti, Syracuse (IT)

(73) Assignee: STMICROELECTRONICS S.r.l., Agrate Brianza (IT)

(*) Notice: Subject to any disclaimer, the term of this patent is extended or adjusted under 35 U.S.C. 154(b) by 0 days.

(21) Appl. No.: 17/143,776

(22) Filed: Jan. 7, 2021

(65) Prior Publication Data
US 2022/0217210 A1 Jul. 7, 2022

(51) Int. Cl.
*H04L 67/51* (2022.01)
*G06F 21/60* (2013.01)
*H04L 9/40* (2022.01)
*H04L 67/10* (2022.01)
*H04L 67/12* (2022.01)

(52) U.S. Cl.
CPC ............ *H04L 67/51* (2022.05); *G06F 21/602* (2013.01); *H04L 63/10* (2013.01); *H04L 67/10* (2013.01); *H04L 67/12* (2013.01)

(58) Field of Classification Search
CPC ......... H04L 67/16; H04L 63/10; H04L 67/10; H04L 67/12; G06F 21/602
USPC ....................................................... 709/219
See application file for complete search history.

(56) References Cited

U.S. PATENT DOCUMENTS

| 4,831,438 | A | 5/1989 | Bellman, Jr. et al. |
| 7,469,303 | B2 | 12/2008 | Jeong et al. |
| 9,351,246 | B2* | 5/2016 | Nieminen ............. G06F 3/0484 |
| 11,019,149 | B2* | 5/2021 | Kim .................... H04L 12/2825 |
| 2009/0019056 | A1* | 1/2009 | Othman .................. H04L 67/12 |
| 2013/0227569 | A1* | 8/2013 | Kohli .................. G06F 9/45558 |
| | | | 718/1 |
| 2015/0254463 | A1* | 9/2015 | Ryhorchuk ......... H04L 63/0442 |
| | | | 713/156 |
| 2016/0036814 | A1 | 2/2016 | Conrad et al. |

(Continued)

FOREIGN PATENT DOCUMENTS

| CN | 106295379 A | 1/2017 |
| CN | 103921759 B | 2/2017 |

(Continued)

*Primary Examiner* — Cheikh T Ndiaye
*Assistant Examiner* — Ayele F Woldemariam
(74) *Attorney, Agent, or Firm* — Seed IP Law Group LLP

(57) ABSTRACT

An integrated circuit includes sensing circuitry and processing circuitry. The processing circuitry processes received sensor-session requests and received sensor-service requests. Processing a received sensor-service request includes determining a type of the received sensor-service request. In response to determining the received sensor-service request is of a first type, results information is generated in response to the received sensor-service request of the first type based on sensor data generated by the sensing circuitry. In response to determining the received sensor-service request is of a second type, remote-server processing based on the received sensor-service request of the second type is initiated, and a response to the received sensor-service request of the second type is generated based on a received response to the initiated remote-server processing.

32 Claims, 25 Drawing Sheets

(56) References Cited

U.S. PATENT DOCUMENTS

| | | | | |
|---|---|---|---|---|
| 2016/0087976 A1* | 3/2016 | Kaplan | ............... | H04L 63/0823 |
| | | | | 713/156 |
| 2017/0201528 A1* | 7/2017 | Kim | ........................ | G06F 21/74 |
| 2018/0018867 A1* | 1/2018 | Locke | ..................... | G06V 20/52 |
| 2021/0258660 A1* | 8/2021 | Stamatakis | ........... | H04W 4/021 |

FOREIGN PATENT DOCUMENTS

| | | |
|---|---|---|
| CN | 106790034 A | 5/2017 |
| EP | 2732674 B1 | 2/2017 |
| WO | WO 2009033141 A1 | 3/2009 |

* cited by examiner

| BEF | AEF | CBF | CAF |
|---|---|---|---|
| Gas channel | Temperature and Humidity compensation | Gas classification in cloud by AI (pre-defined library) | Gas library formation for classification in cloud by AI (Toolbox for AI) |
| | ODR>50Hz | | Dashboard for data monitoring in near real time and notifications |
| | Filters | | Cooperative algorithms for detecting outliers |
| | | | Gas sensor self diagnosis |

FIG. 13

SENSOR DEVICE, SYSTEM AND METHOD

BACKGROUND

Technical Field

The following disclosure relates generally to low-power sensor systems, such as sensor systems for consumer, industrial and medical applications.

Description of the Related Art

Physical condition sensors are associated with high levels of arithmetic computation in order to derive calculated results information based on raw physical sensor data, as well as to compensate for changes in external factors.

Such sensors and sensor systems may typically include one or more sensing elements and one or more application specific integrated circuits (ASICs), and may also include one or more computational circuits (e.g., a multiplier, a floating-point-unit, etc.). Sensor systems may be implemented as a system on a chip.

The sensing elements (e.g., a gas sensor, a temperature sensor, a pressure sensor, a movement sensor, a magnetic field sensor, an accelerometer, a gyroscope, etc., and various combinations thereof), in operation, sense a target physical parameter or condition to be sensed (e.g., gas concentration, temperature, pressure, movement, orientation with respect to a magnetic field, acceleration, orientation with respect to a gravitational field, etc.).

The ASIC may typically comprise one or more analog front ends, one or more analog-to-digital (ND) converters, and one or more digital front ends. The analog front ends drive the sensing elements and measure characteristics or changes in characteristics indicative of target parameters or changes in target parameters to be sensed (e.g., capacitance, voltage and current variations or various combinations thereof).

The A/D converters convert signals generated by the analog front end to digital signals, and may filter and amplify signals generated by the analog front end. The digital front end provides digitalized measured data (e.g., through one or more interfaces, such as an I2C or SPI interface) to an application (e.g., executing on host processor of a mobile device). The digital front end may perform digital filtering, first-in-first-out buffering, interrupt and other digital processing functions on the digitized measured data. Additional processing circuits (e.g., processor cores, floating-point processors, etc.) may be included to facilitate performing more complex tasks. For example, machine learning cores may be embedded in a sensor to recognize, for example, user activities. A host processor may send a request to receive data to a sensor, and may configure the sensor to process sensor data in various manners (e.g., by setting configuration registers; etc.).

BRIEF SUMMARY

In an embodiment, a system comprises: a host processor, which in operation, executes an application that generates sensor-service-authorization requests and sensor-service requests; an integrated sensor device integrated into a chip, which includes: sensing circuitry integrated into the chip, wherein the sensing circuitry, in operation, generates sensor data related to one or more physical conditions; processing circuitry integrated into the chip and coupled to the sensing circuitry, wherein the processing circuitry, in operation, determines a type of a sensor-service request received from the host processor; in response to determining the received sensor-service request is of a first type, generates results information in response to the sensor-service request of the first type based on generated sensor data and transmits the results information to the host processor; in response to determining the sensor-service request is of a second type: initiates remote-server processing based on the sensor-service request of the second type; and generates a response to the sensor-service request of the second type based on a response to the initiated remote-server processing. In an embodiment, the remote-server processing includes allocating memory and computational resources to the request; managing priorities based on request type; etc., and various combinations thereof. In an embodiment, the system comprises encryption circuitry, which, in operation, encrypts communications from the integrated sensor device to the remote server and decrypts communication from the remote server to the integrated sensor device. In an embodiment, the encryption circuitry is integrated into the chip. In an embodiment, the processing circuitry, in operation, responds to a received sensor-service-authorization request by requesting remote-server verification that the application is authorized to receive sensor services. In an embodiment, the application passes encrypted communications between the integrated sensor device and the remote server without decrypting the encrypted communications. In an embodiment, the processing circuitry, in operation, responds to failure to receive verification that the application is authorized by denying access to sensor services to the application. In an embodiment, the first type of request comprises requests directed to functions embedded in the integrated sensor device. In an embodiment, the functions embedded in the integrated sensor device include: the generating results information; compensating for environmental factors; initiating periodic remote-server reauthorization; or combinations thereof. In an embodiment, authorizations may expire (e.g., periodically after a threshold period of time; after a threshold number of uses, etc.) and the integrated sensor device may initiate remote-server reauthorization in response to expiration or in anticipation of expiration of an authorization. In an embodiment, the second type of request comprises requests directed to cloud-based functionality. In an embodiment, the cloud-based functionality includes: sensor diagnostic functionality; sensor aging compensation functionality; sensor environmental factor compensation functionality; dashboard functionality; artificial intelligence classification based on sensor data; artificial intelligence classification based on results information; or combinations thereof. In an embodiment, the environmental factors include temperature, pressure, illumination, sensor location, sensor position, sensor orientation, long-term sensor drift, or combinations thereof. In an embodiment, the system comprises a remote server, which, in operation, generates responses to the sensor-service request of the second type. In an embodiment, the integrated sensor device is a first integrated sensor device, and the system comprises a second integrated sensor device, wherein the remote server, in operation, generates a response to the sensor-service request of the second type based on sensor data generated by the first integrated sensor device and sensor data generated by the second integrated sensor device. In an embodiment, the sensing circuitry includes a humidity sensor, a chemical sensor, a biochemical compound sensor, a radioisotope sensor, an infrared sensor, an air quality sensor, a water quality sensor, a thermal sensor, an organic compound detector, or combinations thereof.

In an embodiment, a device comprises: sensing circuitry integrated into a chip, wherein the sensing circuitry, in operation, generates sensor data related to one or more physical conditions; processing circuitry integrated into the chip and coupled to the sensing circuitry, wherein the processing circuitry, in operation, processes received sensor-session requests and received sensor-service requests, wherein the processing a received sensor-service request includes: determining a type of the received sensor-service request; in response to determining the received sensor-service request is of a first type, generating results information in response to the received sensor-service request of the first type based on generated sensor data; in response to determining the received sensor-service request is of a second type: initiating remote-server processing based on the received sensor-service request of the second type; and generating a response to the received sensor-service request of the second type based on a received response to the initiated remote-server processing. In an embodiment, the remote-server processing includes allocating memory and computational resources to the request; managing priorities based on request type; etc., and various combinations thereof. In an embodiment, the device comprises: encryption circuitry integrated into the chip, wherein the encryption circuitry, in operation, encrypts communications from the processing circuitry to a remote server and decrypts communication from the remote server to the processing circuitry. In an embodiment, the application passes encrypted communications between the processing circuitry and the remote server without decrypting the encrypted communications. In an embodiment, the processing circuitry, in operation, responds to a received sensor-session request by requesting remote-server verification that an application associated with the received sensor-session request is authorized to receive sensor services. In an embodiment, the processing circuitry, in operation, responds to failure to receive verification that the application is authorized by denying sensor-service requests associated with the application. In an embodiment, the first type of request comprises requests directed to functions embedded in the device. In an embodiment, the functions embedded in the device include: the generating results information; compensating for environmental factors; initiating periodic remote-server reauthorization of an application associated with a service-request; or combinations thereof. In an embodiment, authorizations may expire (e.g., periodically after a threshold period of time; after a threshold number of uses, etc.) and the processing circuitry may initiate remote-server reauthorization in response to expiration or in anticipation of expiration of an authorization. In an embodiment, the second type of request comprises requests directed to cloud-based functionality. In an embodiment, the cloud-based functionality includes: sensor diagnostic functionality; sensor aging compensation functionality; sensor environmental factor compensation functionality; dashboard functionality; artificial intelligence classification based on sensor data; artificial intelligence classification based on results information; or combinations thereof. In an embodiment, the sensing circuitry includes a humidity sensor, a chemical sensor, a biochemical compound sensor, a radioisotope sensor, an infrared sensor, an air quality sensor, a water quality sensor, a thermal sensor, an organic compound detector, or combinations thereof.

In an embodiment, a method comprises: processing, using processing circuitry integrated into a sensing-device chip, sensor-session-authorization requests; and processing, using the processing circuitry integrated into a sensing-device chip, sensor-service requests received from an application executing on a host processor, the received sensor-service requests including sensor service requests of a first type and sensor-service requests of a second type, wherein the processing of a received sensor-service request includes: determining a type of the received sensor-service request; in response to determining the received sensor-service request is of the first type, generating results information in response to the sensor-service request of the first type based on sensor data generated by sensing circuitry integrated into the sensing-device chip and transmitting the results information to the host processor; in response to determining the received sensor-service request is of the second type: initiating remote-server processing based on the sensor-service request of the second type; and generating a response to the sensor-service request of the second type based on a response to the initiated remote-server processing. In an embodiment, the remote-server processing includes allocating memory and computational resources to the request; managing priorities based on request type; etc., and various combinations thereof. In an embodiment, the method comprises: encrypting communications from the processing circuitry of the sensing-device chip to the remote server and decrypting communication from the remote server to the sensing-device chip. In an embodiment, the application passes encrypted communications between the sensing-device chip and the remote server without decrypting the encrypted communications. In an embodiment, processing a received sensor-service-authorization request comprises requesting remote-server verification that an application associated with the received sensor-service-authorization request is authorized to receive sensor services. In an embodiment, authorizations may expire (e.g., periodically after a threshold period of time; after a threshold number of uses, etc.) and the sensing-device chip may initiate remote-server reauthorization in response to expiration or in anticipation of expiration of an authorization. In an embodiment, the received sensor-service request of the second type requests sensor-services providing: sensor diagnostic functionality; sensor aging compensation functionality; sensor environmental factor compensation functionality; dashboard functionality; artificial intelligence classification functionality based on sensor data; artificial intelligence classification functionality based on results information; or combinations thereof.

In an embodiment, a non-transitory computer-readable medium's contents configure processing circuitry of a sensing-device chip to perform a method, the method comprising: processing sensor-session-authorization requests; and processing sensor-service requests received from an application executing on a host processor, the received sensor-service requests including sensor service requests of a first type and sensor-service requests of a second type, wherein the processing of a received sensor-service request includes: determining a type of the received sensor-service request; in response to determining the received sensor-service request is of the first type, generating results information in response to the sensor-service request of the first type based on sensor data generated by sensing circuitry integrated into the sensing-device chip and transmitting the results information to the host processor; in response to determining the received sensor-service request is of the second type: initiating remote-server processing based on the sensor-service request of the second type; and generating a response to the sensor-service request of the second type based on a response to the initiated remote-server processing. In an embodiment, the remote-server processing includes allocating memory and computational resources to the request; managing priorities based on request type; etc., and various combinations thereof. In an embodiment, the method comprises: encrypting communications from the processing circuitry of the sensing-device chip to the remote server and decrypting communication from the remote server to the sensing-device chip. In an embodiment, the application passes encrypted communications between the sensing-device chip and the remote server without decrypting the encrypted communications. In an embodiment, the sensing-device chip may request authorization of the application from the remote server. In an embodiment, authorizations may expire (e.g., periodically after a threshold period of time; after a threshold number of uses, etc.) and the sensing-device chip may initiate remote-server reauthorization in response to expiration or in anticipation of expiration of an authorization. In an embodiment, the contents comprises instructions, which when executed by the processing circuitry, cause the processing circuitry to perform the method.

BRIEF DESCRIPTION OF THE SEVERAL VIEWS OF THE DRAWINGS

FIG. 13 is a conceptual diagram illustrating an example distribution of functionality in a system providing gas sensor access as a service.

DETAILED DESCRIPTION

Figure 1:
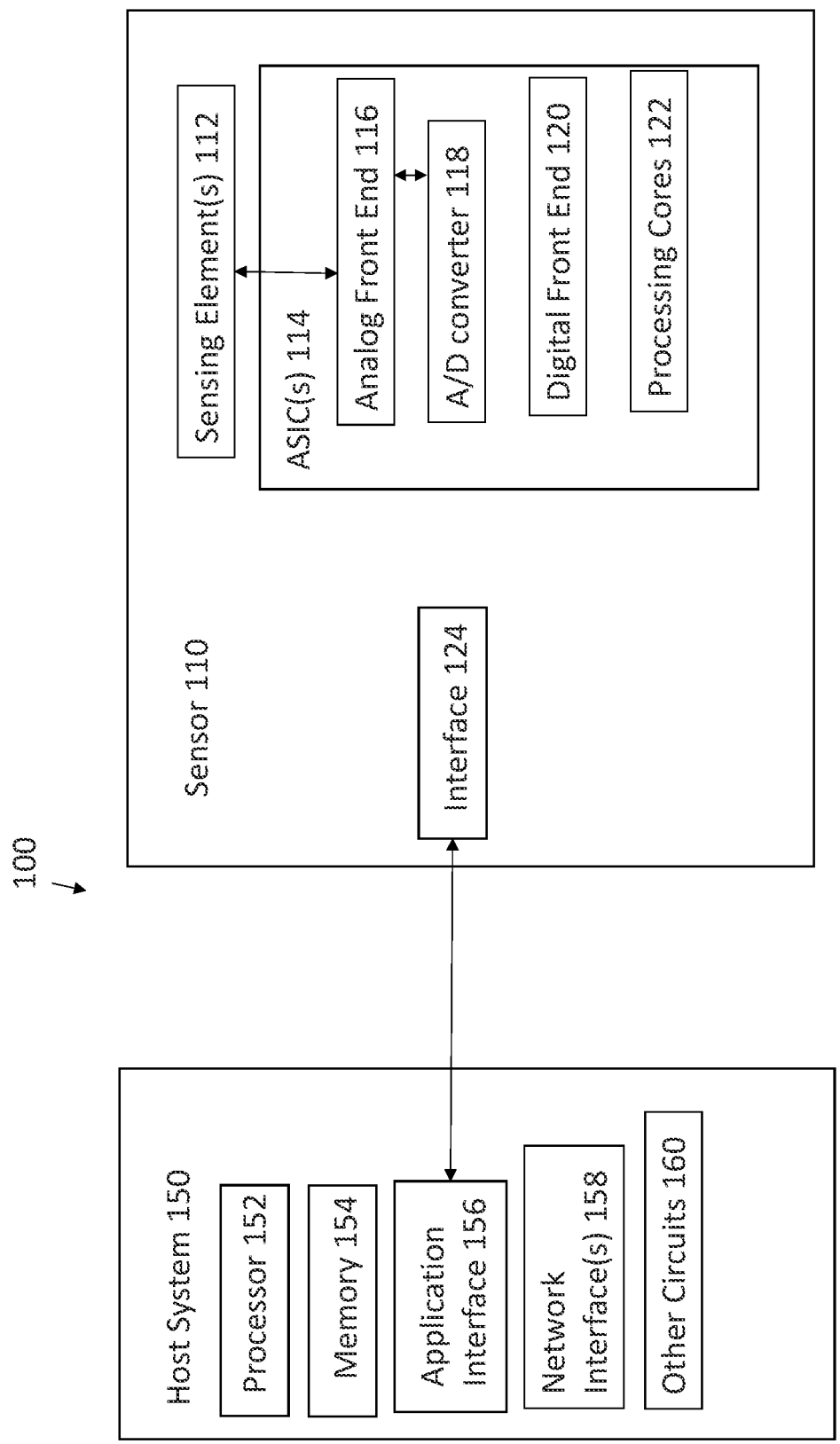
FIG. 1 is a functional block diagram of a sensor system.

In the following description, certain details are set forth in order to provide a thorough understanding of various embodiments of devices, systems, methods and articles. However, one of skill in the art will understand that other embodiments may be practiced without these details. In other instances, well-known structures and methods associated with, for example, circuits, such as transistors, multipliers, adders, dividers, comparators, integrated circuits, logic gates, finite state machines, accelerometers, gyroscopes, magnetic field sensors, gas sensors, memories, bus systems, etc., have not been shown or described in detail in some figures to avoid unnecessarily obscuring descriptions of the embodiments.

Unless the context requires otherwise, throughout the specification and claims which follow, the word "comprise" and variations thereof, such as "comprising," and "comprises," are to be construed in an open, inclusive sense, that is, as "including, but not limited to."

Reference throughout this specification to "one embodiment," or "an embodiment" means that a particular feature, structure or characteristic described in connection with the embodiment is included in at least one embodiment. Thus, the appearances of the phrases "in one embodiment," or "in an embodiment" in various places throughout this specification are not necessarily referring to the same embodiment, or to all embodiments. Furthermore, the particular features, structures, or characteristics may be combined in any suitable manner in one or more embodiments to obtain further embodiments.

The headings are provided for convenience only, and do not interpret the scope or meaning of this disclosure.

The sizes and relative positions of elements in the drawings are not necessarily drawn to scale. For example, the shapes of various elements and angles are not drawn to scale, and some of these elements are enlarged and positioned to improve drawing legibility. Further, the particular shapes of the elements as drawn are not necessarily intended to convey any information regarding the actual shape of particular elements, and have been selected solely for ease of recognition in the drawings.

The present disclosure is directed to, inter alia, techniques for providing generated sensor results information directly from an integrated sensor device (such as a system-on-chip or "SoC" device) to an application, using remote processing resources (e.g., cloud processing resources), for example, in combination with local processing resources, such as processing resources embedded in a sensor device. For example, rather than providing raw physical sensor data to an external application processor for processing, in various embodiments an integrated sensor device on a chip may access one or more remote processing resources to perform such processing, via one or more interfaces through which the calculated/generated results information may be provided. For example, as part of providing sensor services to an application, a sensor device and a remote server may exchange communications using defined protocols (e.g., encryption). The application may pass such encrypted communications using defined protocols between the integrated sensor device and the remote server without decrypting of the encrypted communications by the application.

As used herein, "sensor" may refer to any component that generates electrical and/or electronic signals indicative of one or more substances and/or physical conditions present in its immediate surroundings, and may include as non-limiting examples: a humidity sensor, particle detector, gas sensor, chemical sensor, biochemical sensor, radioisotope sensor, infrared sensor, air quality sensor, water quality sensor, thermal sensor, organic compound detector, magnetic field sensor, pressure sensor, an accelerometer, etc., and various combinations thereof. It will be appreciated that while many examples herein are provided with respect to a "gas sensor," any other sensor, as well as various combinations of sensors and of types of sensors, may be used in accordance with the techniques presented herein.

FIG. 1 depicts a functional block diagram of a known configuration for system 100, including a sensor device 110, which may be implemented as a system on a chip, and a host system 150. The sensor device 110 as illustrated includes one or more sensing elements 112, one or more application specific integrated circuits (ASICs) 114, and one or more interfaces 124.

The one or more sensing elements 112 (which may comprise, e.g., a gas sensor, a temperature sensor, a pressure sensor, a movement sensor, a magnetic field sensor, an accelerometer, a gyroscope, etc., and various combinations thereof), in operation, sense one or more target parameters to be sensed (e.g., one or more indications of gas concentration, temperature, pressure, movement, orientation with respect to a magnetic field, acceleration, orientation with respect to a gravitational field, etc.).

The ASICs 114 may typically comprise one or more analog front ends 116, one or more analog-to-digital (ND) converters 118, and one or more digital front ends 120. The analog front ends 116 drive the sensing elements 112 and measure characteristics or changes in characteristics indicative of target parameters or changes in target parameters to be sensed (e.g., capacitance, voltage and current variations or various combinations thereof).

The A/D converters 118 convert signals generated by the analog front ends 116 to digital signals, and may filter and amplify signals generated by the analog front ends 116. The digital front ends 120 provide digitalized measured data (e.g., through one or more interfaces, such as an I2C or SPI interface) to an application (e.g., stored in a memory 154 and executing on host processor 152 of a host system 150, such as a mobile device). The digital front ends 120 may perform digital filtering, first-in-first-out buffering, interrupt and other digital processing functions on the digitized measured data. Additional processing circuits 122 (e.g., processor cores, floating-point processors, etc.) may be included to facilitate performing more complex tasks. For example, machine-learning cores may be embedded in a sensor 110 to recognize, for example, user activities. The host processor 152 may send a request via an application interface 156 and an interface 124 of the sensor 110 to receive data from the sensor 110, and may configure the sensor 110 to process sensor data in various manners (e.g., by setting configuration registers in the sensor; etc.). As illustrated, the host system 150 includes additional interfaces, such as network interfaces 158, and other functional circuits 160 (e.g., controllers to control other devices based on received sensor information; power supplies; bus systems; etc.).

Figure 2:
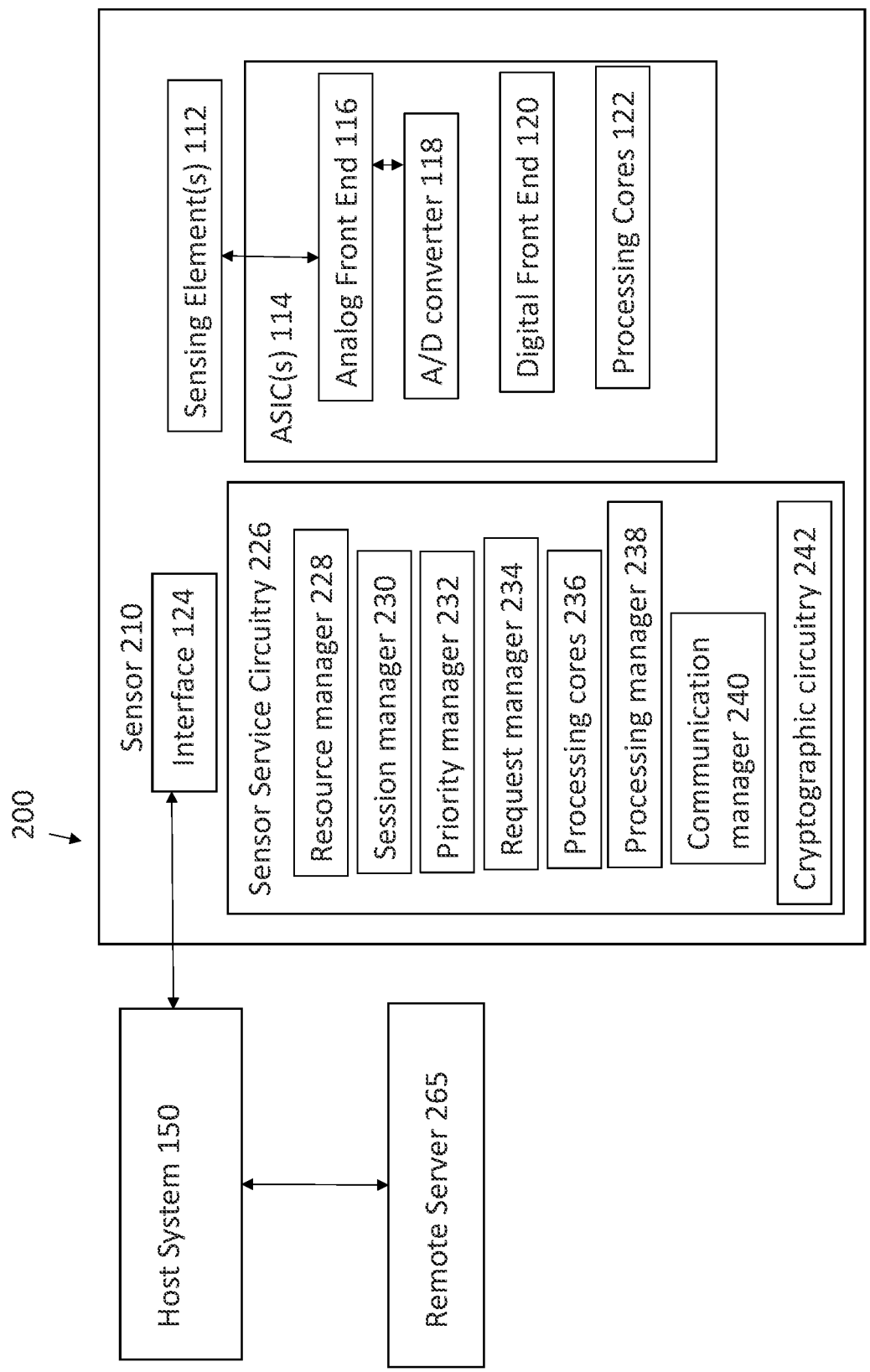
FIG. 2 is a functional block diagram of an embodiment of a sensor system in accordance with various techniques presented herein.

FIG. 2 depicts a functional block diagram of a configuration for system 200, including a sensor device 210, which may be implemented as a system on a chip, a host system 150, such as the host system 150 of FIG. 1, and a remote server 265. The sensor 210, in operation, provides data sensing as a service to the host system 150. As compared to the sensor 110 of FIG. 1, the sensor 210 of FIG. 2 includes sensor service management circuitry 226. The sensor service management circuitry, as illustrated, includes a resource manager 228, a session manager 230, a priority manager 232, a request manager 234, additional processing cores 236 to handle sensor data processing tasks, a processing manager 238, a communication manager 240 and cryptographic circuitry 242. Usage data may be communicated to the remote server 265, which may also handle authentication functions. As compared to the system 100 of FIG. 1, the system 200 requires substantial additional processing resources and memory in the sensor device 210, which require additional space, power and other resources, and thus may not be practical to implement in a competitive marketplace. In addition, an application executing on the host system 130 initiates sensor service sessions by communicating with the remote server 265, and may perform or facilitate performance of other tasks as well (e.g., authentication, tracking of sessions, firmware updates, etc.).

Figure 3:
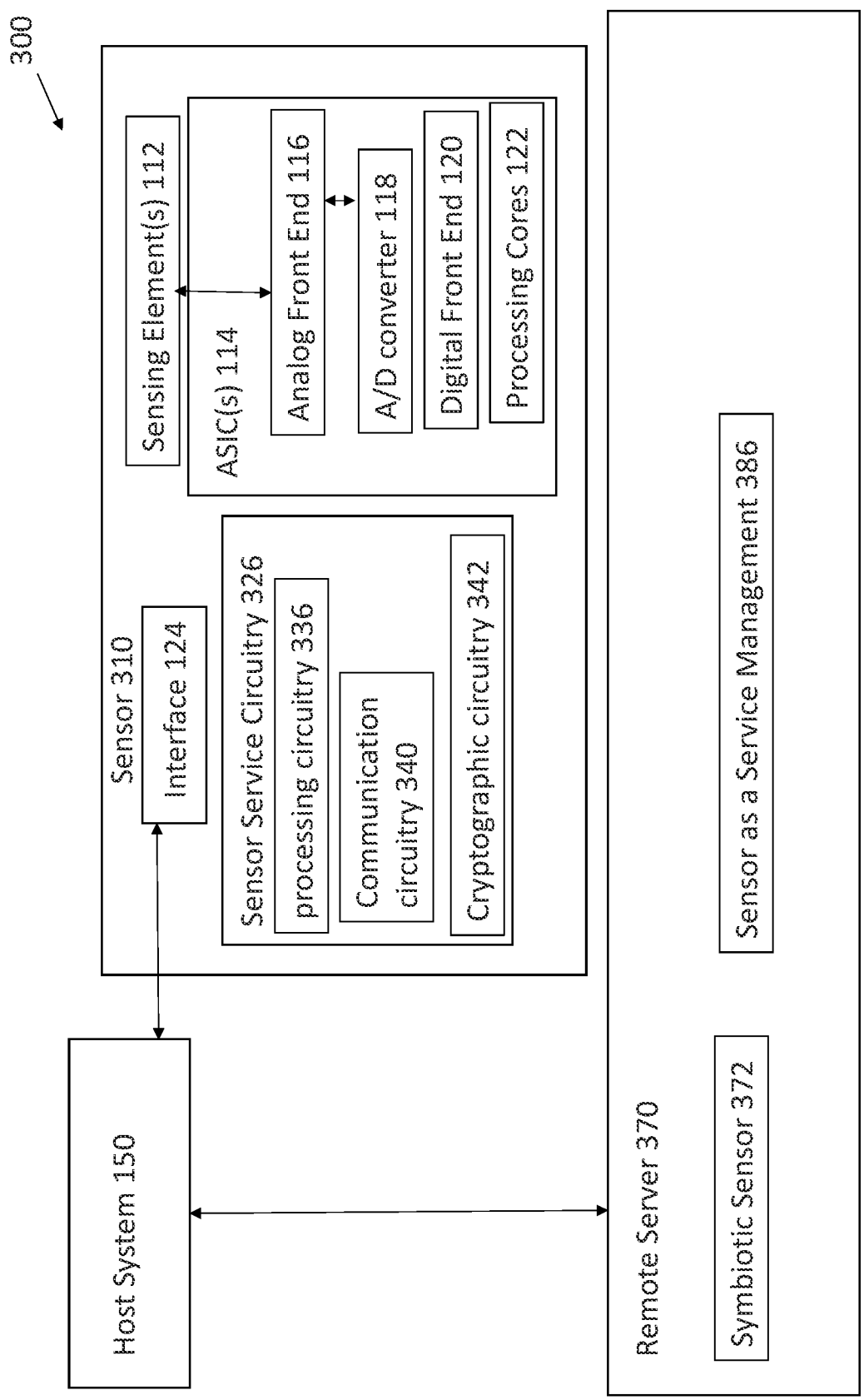
FIG. 3 is a functional block diagram of an embodiment of a sensor system in accordance with various techniques presented herein.

FIG. 3 depicts a functional block diagram of a configuration for system 300, including a sensor device 310, which may be implemented as a system on a chip, a host system 150, such as the host system 150 of FIG. 1, and a remote server 370, such as a cloud server. As compared to the sensor 210 of FIG. 2, the sensor 310 and the remote or cloud server 370 of FIG. 3 collectively provide sensed data as a service to the host system 150, with the host system 150 generally operating as operating as though it were communicating with a standard sensor, as discussed in more detail below. The sensor service circuitry 326 of the sensor 310 is simplified, as illustrated including processing circuitry or cores 336 (which may be substantially simplified as compared to the processing circuitry 236 of FIG. 2), to handle sensor data processing tasks, a communication manager or circuitry 340 and cryptographic circuitry 342. The sensor 310 may be viewed as one sensor of a pair of symbiotic sensors, with the remote or cloud server 370 includes another symbiotic sensor 372 of the pair, as well as sensor as a service management circuitry 386. The sensor 310 is more practical to implement as part of a system of providing sensed data as a service due to the simplification of the circuitry and the reduced resource needs of the sensor 310. The sensor 310, in operation, performs local functions, including by using the processing circuitry 336, and has an embedded interpreter or communication circuit 340 and a cryptographic 342 circuit, to coordinate with the symbiotic sensor 372 and sensor as a service management circuitry 386 of the remote server 370.

The communication circuitry 340 implements one or more communication protocols to communicate with the host system 150 (e.g., in clear) and with the remote (cloud) server 370 (e.g., via messages encrypted/decrypted by the cryptographic circuitry 342) and with the processing circuitry 326 and/or the ASIC 114 (e.g., in clear). The cryptographic circuitry 342 may employ standard or proprietary encryption schemes using public or private keys in various manners to encrypt/decrypt messages exchanged between the local sensor 310 and the remote server 370. In some embodiments, the cryptographic circuitry may be external to the sensor 310 (e.g. a separate chip or part of the host system). A sensor-specific key (public or private) may be embedded in the sensor 310. The processing circuitry 336 and/or the ASIC 114 executes service requests (alone or in coordination with symbiotic sensor 372 of the remote server 370) and provides unencrypted results to the host system 150 through the communication circuitry 340. In some embodiments, elements of the system 300 may be combined or split in various manners. For example, all or part of the sensor service circuitry 326 may be integrated into the ASIC 114 in some embodiments.

Figure 4:
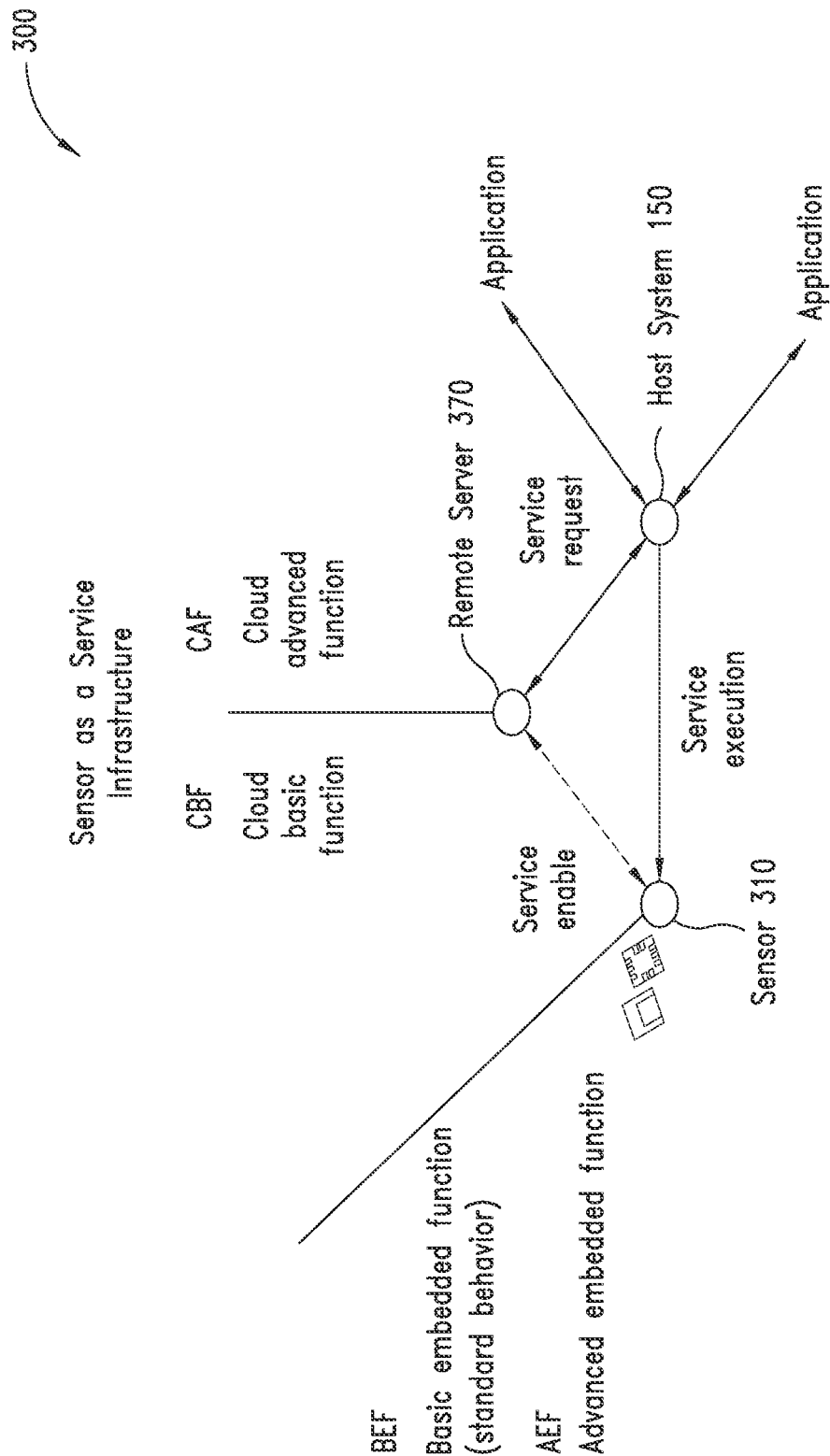
FIG. 4 is a conceptual diagram illustrating example functions provided by and communications between a host system, a sensor and a remote server in an embodiment.

FIG. 4 is a conceptual diagram illustrating example functions provided by and communications between the host system 150, the sensor 310 and the remote server 370 of FIG. 3 in an embodiment. As illustrated, the host 150 sends a service request to the remote server 370, for example under control of an application executing on the host. The remote server 370 enables the sensor 310 to provide sensor services to the host system 150, possibly by send an encrypted enable message to the sensor 310 through the host 150. The host 150 communicates with the sensor 310 during execution of the sensor services, for example, using unencrypted communications, and the sensor 310 communicates with the remote server 370, for example using encrypted communications (which may be routed through the host 150, e.g., without decryption by the host), to provide and manage the services in a symbiotic manner with the remote server 370. The sensor 310 may, for example, provide basic embedded functions, which may be standard sensor functions such as generating raw data, and advanced embedded functions, such as compensating for environmental conditions. The remote or cloud server 370 may provide basic cloud functions, such as sensor as a service management operations, and advanced cloud functions, such as advanced sensor services such as machine learning analysis of raw data and results based on the analysis, algorithm updates, etc. The host system 150 provides the results to the application executing on the host system 150.

Figure 5:
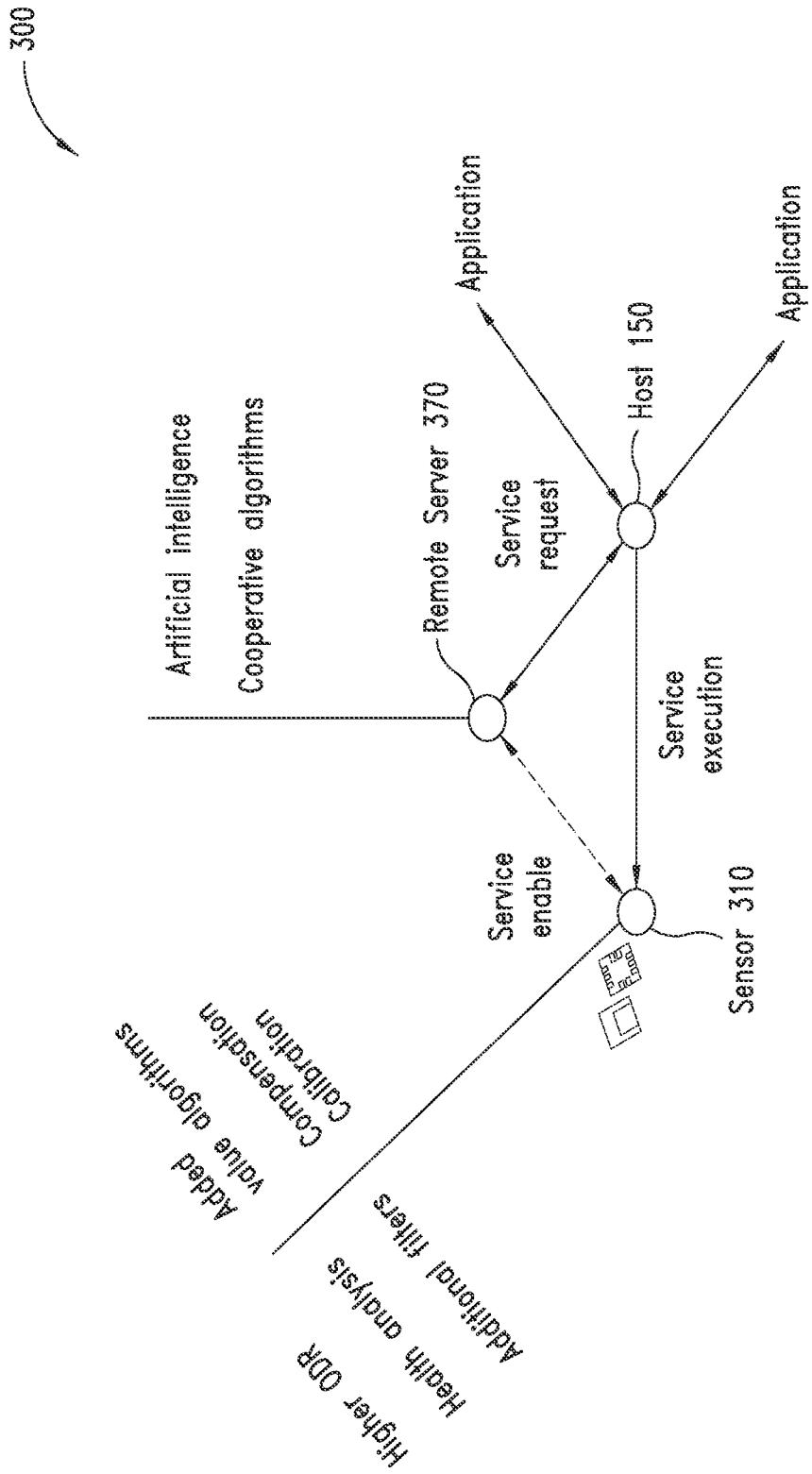
FIG. 5 is a conceptual diagram illustrating example functions provided by and communications between a host system, a sensor and a remote server in an embodiment.

The basic and advanced sensor services may be distributed between the sensor 310 and the remote or cloud server 370 in various manners. FIG. 5 is another conceptual diagram illustrating an example distribution of functions provided the sensor 310 and the remote server 370 of FIG. 3 in an embodiment. As illustrated, the sensor 310 provides sampling rate (ODR) management, health analysis, and filtering, value added algorithms, and compensation calibration services. The remote server provides artificial intelligence-based services and controls execution of cooperative algorithms (e.g., all or part of the compensation calibration services). Examples of sensor services that may be provided (e.g., by the sensor 310 and the remote server 370 working together in a symbiotic manner) include:

Monitoring of sensor performance during sensor life (e.g., compensating for sensor stability over time);

Compensation for changes in environmental conditions (e.g., accuracy drift due to humidity and temperature variations);

Initial sensor calibration (e.g., in the field based on reference conditions);

Periodic verification and recalibration (e.g., based on reference conditions);

Periodic self-test (e.g., sensor 310 self-diagnostic triggered by remote server 370);

Use-on-time monitoring of sensor resources and functions (e.g., ODR, filtering, digital functions);

Detection and prediction of sensor anomalies (e.g., machine learning/artificial intelligence algorithms for detecting and predicting anomalies and compensating for the anomalies (e.g., backup mechanisms);

Computational analysis for advanced functions (e.g., remote server analysis of updates of models on time and sensor edge deployment). For example, a symbiotic sensor of a remote server may store a compensation model (e.g., gyroscope v. humidity) that may be employed by the sensing device. The model may be updated by the remote server and transmitted to the sensing device (e.g., periodically) to replace a previous model employed by the sensing device;

Replaceable and adaptable intelligence to detected user context (triggering changes in sensor behaviors based on cloud analysis of use conditions);

Development of cooperative algorithms among sensors (remote server 370 coordination of multiply sensors 310 simultaneously);

Protection against unauthorized use (e.g., restricting operation of a sensor 310 without a token from the server 370); and Various combinations thereof.

Figure 6:
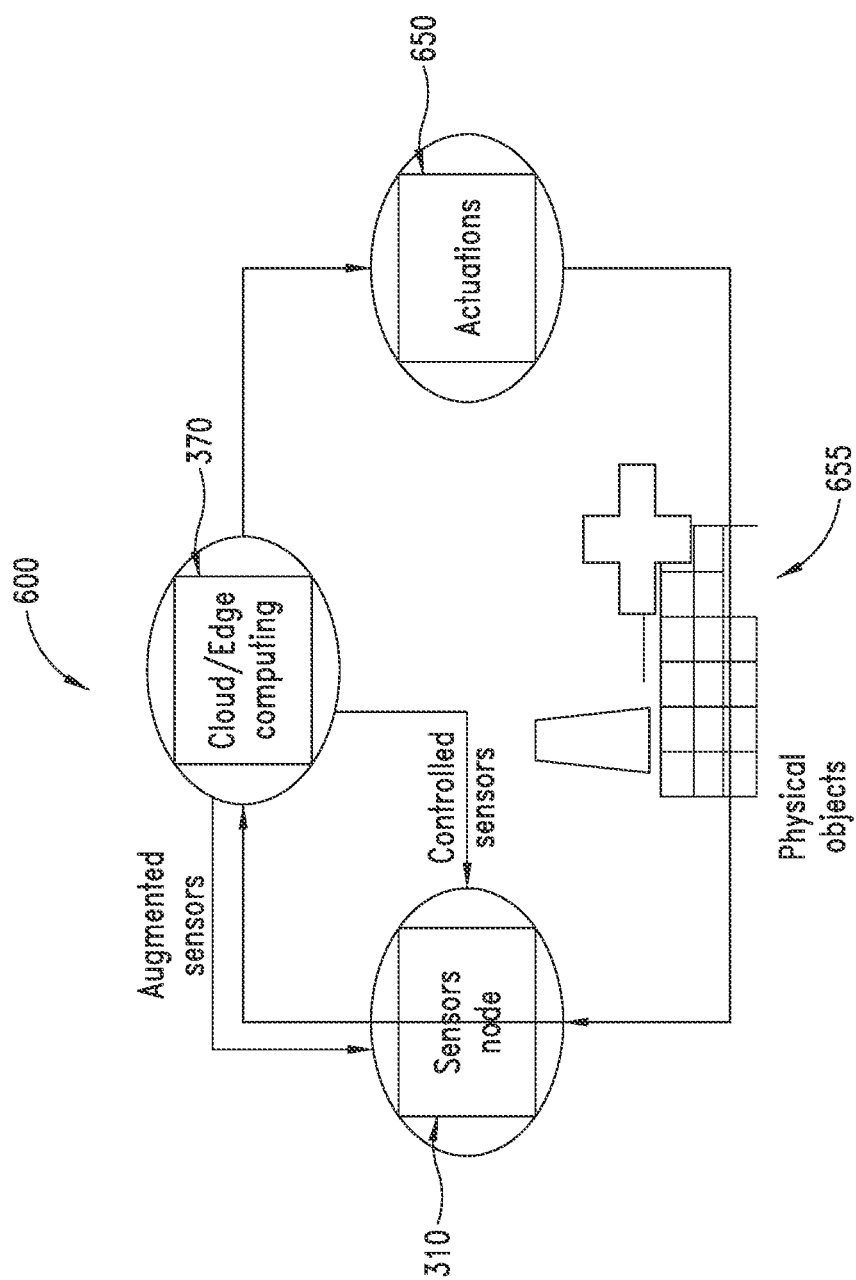
FIG. 6 is a conceptual diagram illustrating a system employing one or more sensors and a remote server to control actuators operating on physical objects in an embodiment.

FIG. 6 is a conceptual diagram illustrating a system 600 that may employ one or more sensors 310 and a remote server 370 to control actuators 650 operating on physical objects 655 (e.g., automotive control systems actuating components of an automobile, such as a cruise control system or a crash avoidance system of an automobile).

Figure 7:
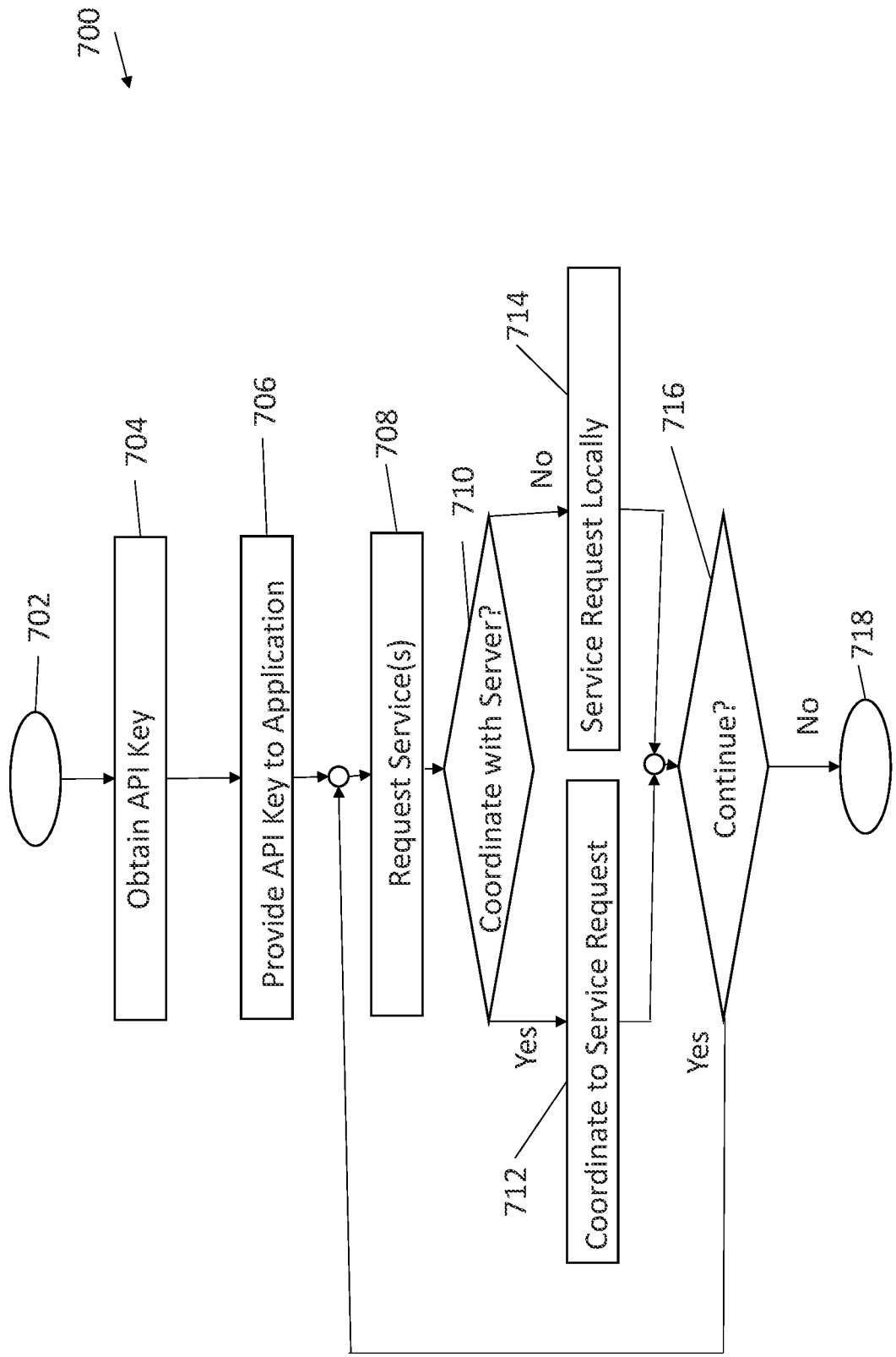
FIG. 7 illustrates an embodiment of a method of providing sensor usage as a service using an application programming interface (API) key.

Some embodiments may employ an application programming interface (API) key. FIG. 7 illustrates an embodiment of a method 700 of providing sensor usage as a service using an API key, which may be performed using, for example, the system 300 of FIG. 3. For convenience, the method 700 will be described with reference to the host system 150, the sensor 310 and the remote server 370 of FIG. 3. The method 700 may be performed using other systems. The method 700 begins at 702 and proceeds to 704. At 704, the host system (e.g., an application board in an automotive control system) obtains an application programming interface key (API key), for example from a remote server 370 associated with the sensor 310. This may be performed, for example, when the host system 150 (e.g., application board) is manufactured or initialized. The API key may, for example, be associated with an account associated with the host system, and the remote server 370 may determine authorized activities and details associated with providing the authorized activities based on stored information associated with the account. In another example, the API may indicate (e.g., through embedded flags or fields of the API) authorized activities and details associated with providing authorized activities. The method 700 proceeds from 704 to 706.

At 706, the method 700 provides the API key to applications executing on the host system 150, which are authorized to obtain sensor data as a service. This may be performed when the host system is manufactured, or each time an application is initialized (e.g., the API key may be stored in a secure manner by the host system 150 and provided to an authorized application as needed), etc. The method proceeds from 706 to 708.

At 708, the method 700 sends a service request to obtain sensor services. For example, the application executing on the host system 150 may send a service request including the API key to the sensor 310. The service requests may include requests to receive services associated with basic functions (BEF) embedded in the sensor 310, requests to receive services associated with advanced embedded functions (AEF) embedded in the sensor 310, requests to receive services associated with cloud based functions (CEF), requests to receive services associated with cloud advanced functions (CAF), and requests to receive services associated with various combinations of BEF, AEF, CEF and CAF functions. The method 700 proceeds from 708 to 710.

At 710, the method 700 determines one or more type of services associated with the service request. For example, the sensor 310 may determine whether the requested services are types of services which may be provided without coordinating with the remote server 370 to provide the requested services (e.g., a request directed to only BEF services in an embodiment), or are instead types of services which require coordination with the remote server 370 to provide the requested services (e.g., a request directed to any combination including AEF, CEF or CAF services in an embodiment). This may be done, for example, by interpreting the service request, e.g. using an interpreter, using a look-up table, etc. Coordination may be employed, for example, when it is desired to track the usage of the services (e.g., AEF services in an embodiment), when it is desired to confirm authorization to perform a particular type of service (e.g., AEF, CEF, CAF and certain types of BEF services in an embodiment), when it is desired to use processing services on the remote server to provide the requested services in whole or in part (e.g., CEF or CAF services in an embodiment); etc., and various combinations thereof. Some service requests may be handled locally by the sensor 310, for example, when authorization or tracking of usage of a particular service is not necessary or desired, and the sensor 310 is capable of responding to the request without coordinating with the server 370.

When it is determined at 710 that service of the service request should be coordinated by the sensor 310 and the remote server 370, the method 700 proceeds to 712, where the request is serviced by the sensor 310 in coordination with the server 370. The method 700 proceeds from 712 to 716.

When it is not determined at 710 that service of the service request should be coordinated by the sensor 310 and the remote server 370, the method 700 proceeds to 714, where the request is serviced by the sensor 310. The method 700 proceeds from 714 to 716.

At 716, the method 700 determines whether to continue processing service requests. When it is determined at 716 to continue to process service requests, the method 700 proceeds from 716 to 708, to wait for another service request. When it is not determined at 716 to continue to process service requests, the method 700 proceeds from 716 to 718, where the method 700 may stop or may perform other processing, such as updating sensor usage tracking information associated with the API key.

Embodiments of the method 700 may contain additional acts not shown, may omit illustrated acts, may perform acts in various orders or in parallel, etc. For example, in some embodiments additional acts may be performed, for example, to periodically compensate for an age of the sensor, to provide software updates to the sensor 310, to periodically confirm an API key remains valid, etc. In some embodiments, cryptographic operations may be performed, for example, to exchange encrypted messages securely between the sensor 310 and the server 370, while providing results information in clear to an application executing on the host 150.

Figure 8:
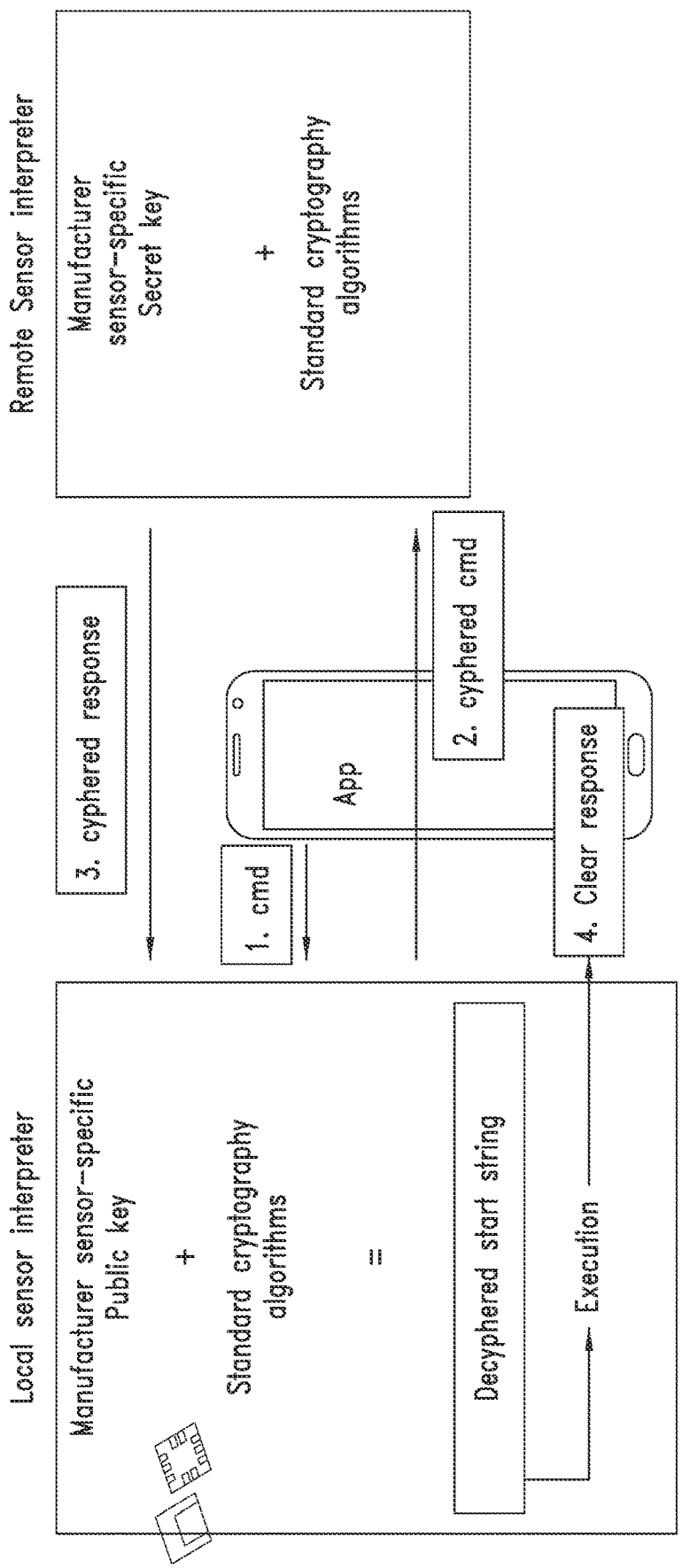
FIGS. 8 and 9 are conceptual diagrams illustrating example exchanges of information between a sensor and a remote server in an embodiment.
Figure 9:
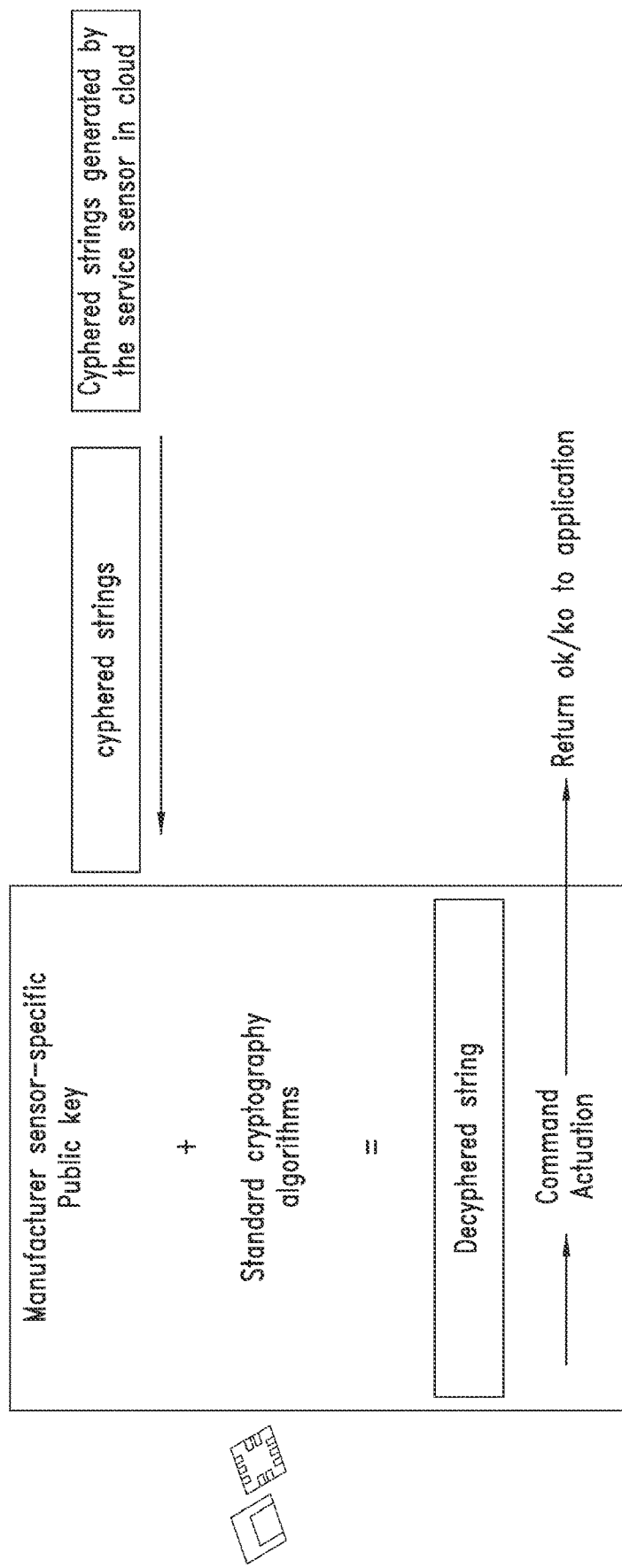

FIGS. 8 and 9 are conceptual diagrams for illustrating an example method of communications between an interpreter of a local sensor and an interpreter of a remote symbiotic sensor executing on a remote server, and between the local sensor and an application executing on a host device. As illustrated, the application sends 1 a command to the local sensor. The command may include an API key. In response, the local sensor encrypts or cyphers the command and transmits 2 the cyphered command to the remote symbiotic sensor executing on the remote (e.g., cloud) server. The remote symbiotic sensor executing on the remote (e.g., cloud) server sends a cyphered response 3 to the local sensor. Based on the cyphered response, the local sensor generates a clear (unencrypted) response and transmits the clear response to the application executing on the host device. Communications between the local sensor and the remote symbiotic sensor in the cloud are secure, and the response (e.g., an indication (ok) to proceed with the service request, or an indication (ko) the request is invalid) is sent in clear to the application.

Figure 10:
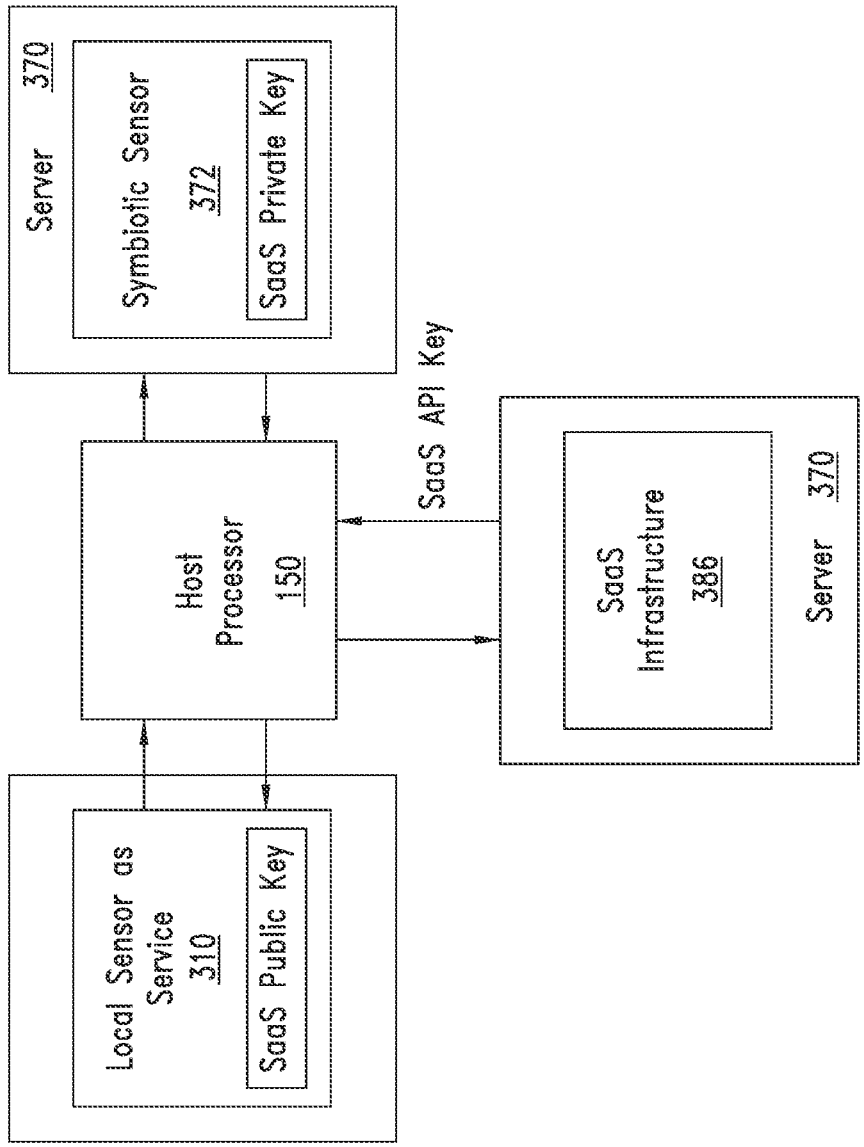
FIG. 10 is a conceptual diagram for illustrating encryption of communications between a local sensor and a symbiotic sensor via a host processor in an embodiment.

FIG. 10 is a conceptual diagram for illustrating encryption of communications between a local sensor (e.g., sensor 310 of system 300 of FIG. 3) and a symbiotic sensor (e.g., symbiotic sensor 372 executing in the remote server 370 of FIG. 3) via a host processor (e.g., host system 150 of FIG. 3). The local sensor 310 stores a sensor-as-a-server (SaaS) public key, the server 370 stores an SaaS private key, and provides an API key to the host processor. The API key is used to identify an account associated with the host processor, and the SaaS public key and the SaaS private key are used to secure communications between the local sensor 310 and the symbiotic sensor 372 and SaaS infrastructure 386 of the remote server 370.

Figure 11:
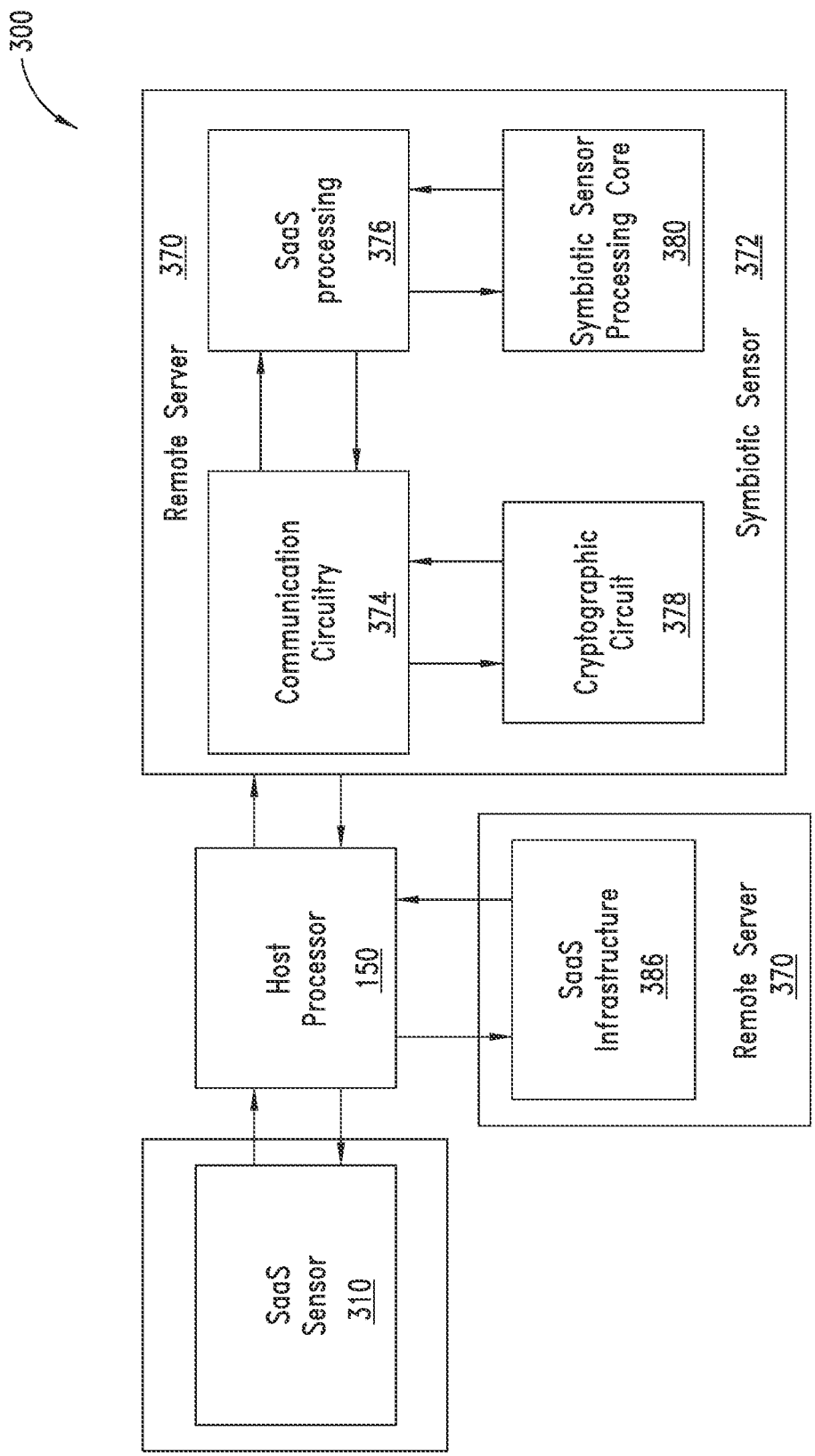
FIG. 11 is a functional block diagram of an embodiment of a system of providing sensor data and results as a service, illustrating example elements of a symbiotic sensor in an embodiment.

FIG. 11 is a functional block diagram illustrating an embodiment of the system 300 of FIG. 3 of providing sensor data and results as a service, showing details of the symbiotic sensor 372 of an embodiment. As illustrated, the symbiotic sensor 372 includes communication circuitry 374, SaaS processing circuitry 376, cryptographic circuitry 378, and a symbiotic sensor processing core 380. The communication circuitry 374 implements one or more communication protocols to securely communicate with one or more local sensors 310 (e.g., via messages encrypted/decrypted by the cryptographic circuitry 378). The cryptographic circuitry 378 may employ standard or proprietary encryption schemes using public or private keys in various manners to encrypt/decrypt messages exchanged between the local sensor 310 and the remote server 370. In some embodiments, the cryptographic circuitry may be external to the symbiotic sensor 372 (e.g. a separate chip or part of the remote server. For example, a private key may be embedded in the symbiotic sensor 372. The SaaS processing circuitry 376 and/or the symbiotic sensor processing core 380 executes service requests (generally in coordination with sensor 310) and provides encrypted results to the sensor 310 via the communication circuitry 374 and the cryptographic circuitry 378.

Figure 12:
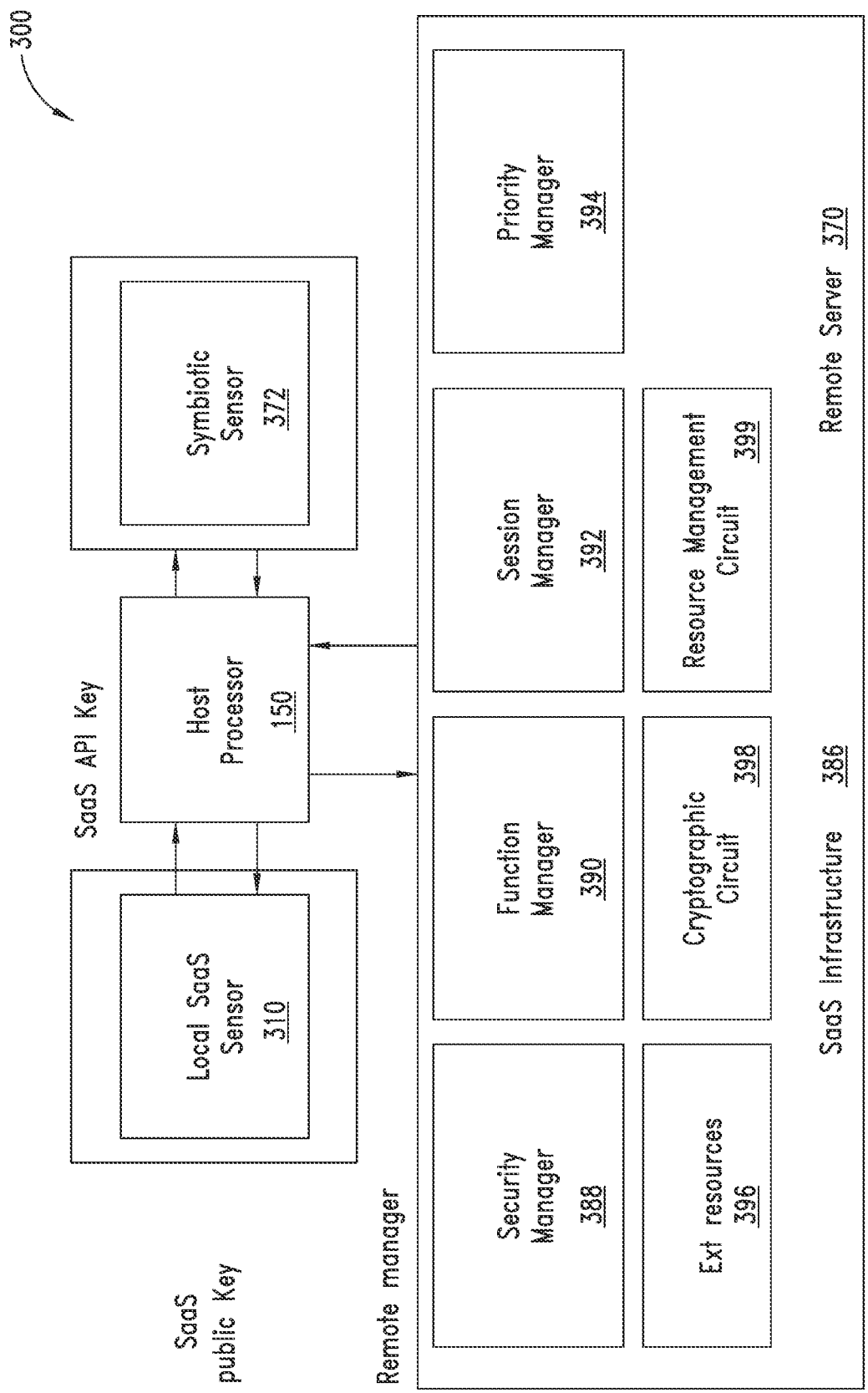
FIG. 12 is a functional block diagram of an embodiment of a system of providing sensor data and results as a service, illustrating example elements of a service as a sensor management infrastructure of an embodiment.

FIG. 12 is a functional block diagram illustrating an embodiment of the system 300 of FIG. 3 of providing sensor data and results as a service, showing details of the SaaS infrastructure 386 of an embodiment. As illustrated, the SaaS infrastructure 386 is embedded in the remote server 370 and includes a security manager 388, a function manager 390, a session manager 392, a priority manager 394, external resources 396, cryptographic circuitry 398 and resource management circuitry 399. Although the symbiotic sensor 372 and the SaaS infrastructure 386 are illustrated as embedded in a remote server 370, the elements of the symbiotic sensor 372 and the SaaS infrastructure 386 may be distributed in multiple servers in various configurations.

Figure 14:
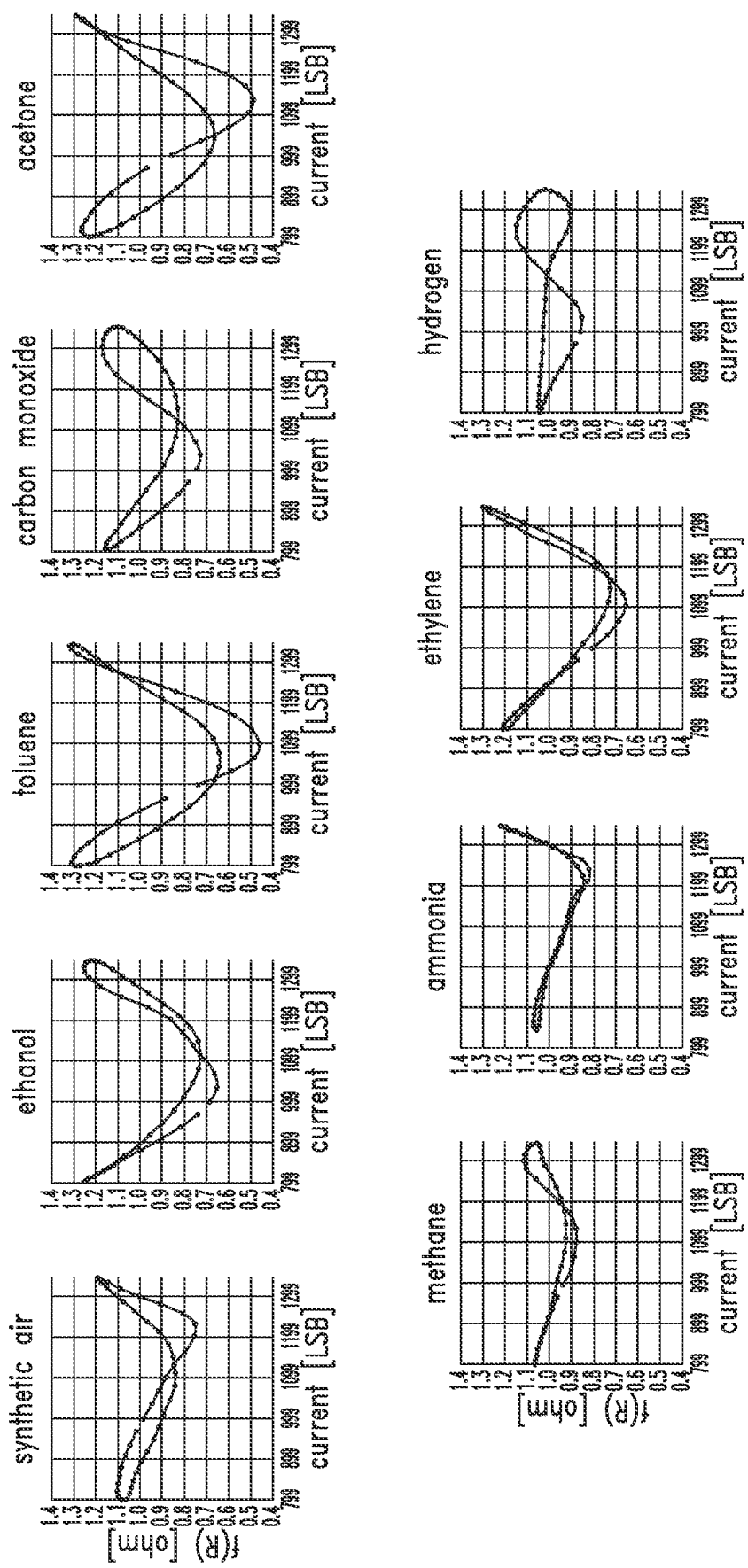
FIGS. 14 and 15 are conceptual diagrams illustrating example data of an AI gas classification library.
Figure 15:
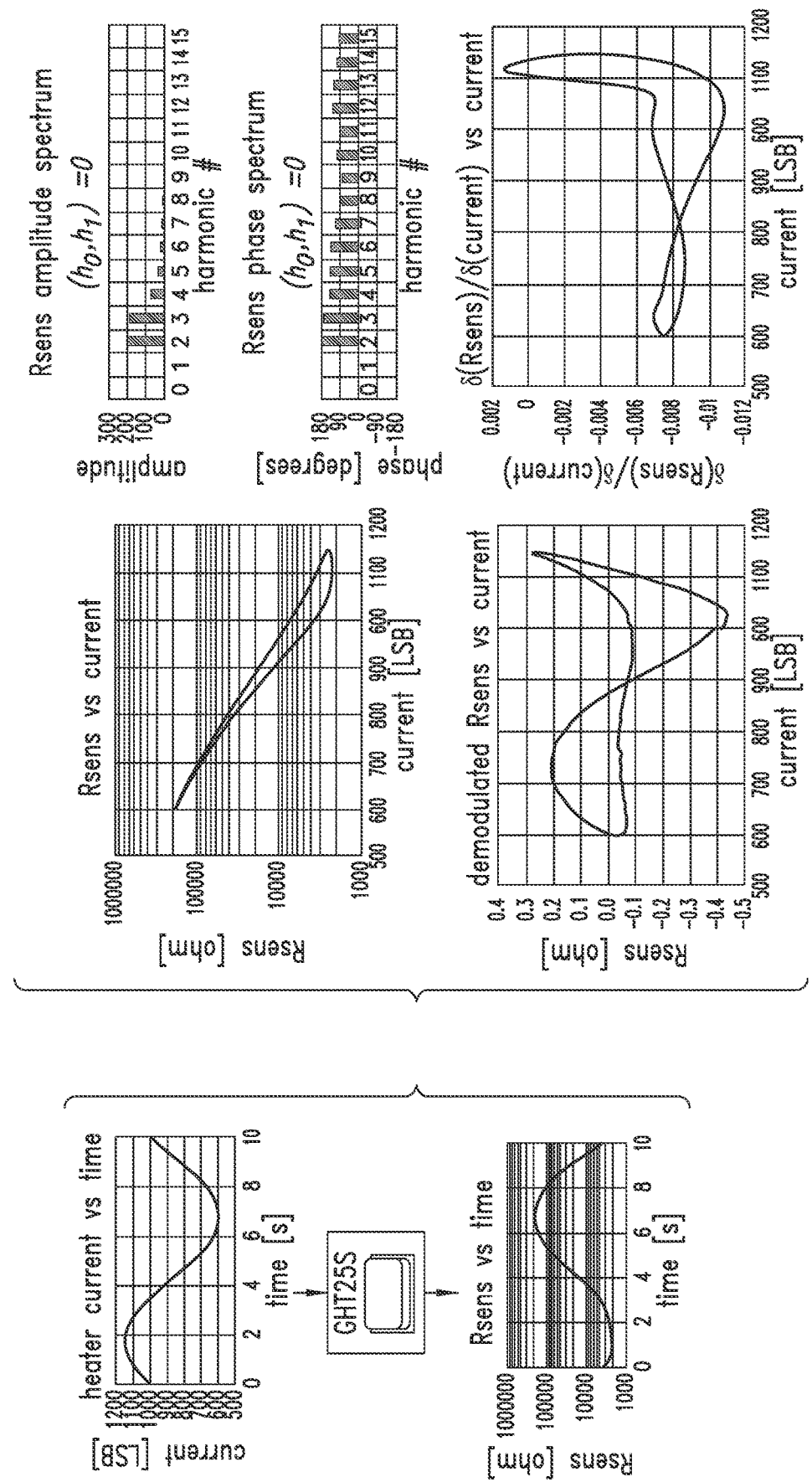
Figure 16A:
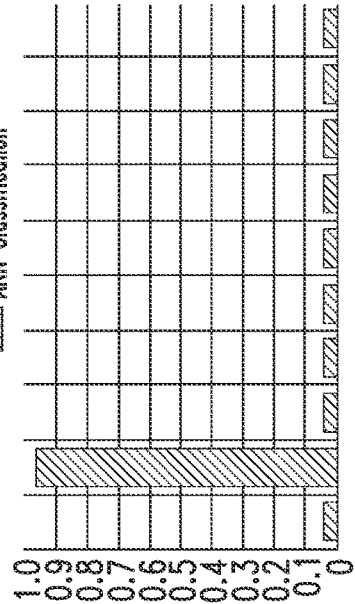
FIGS. 16A and 16B are conceptual diagrams illustrating an example dashboard that may be employed to facilitate cloud management of a SaaS system.
Figure 16A:
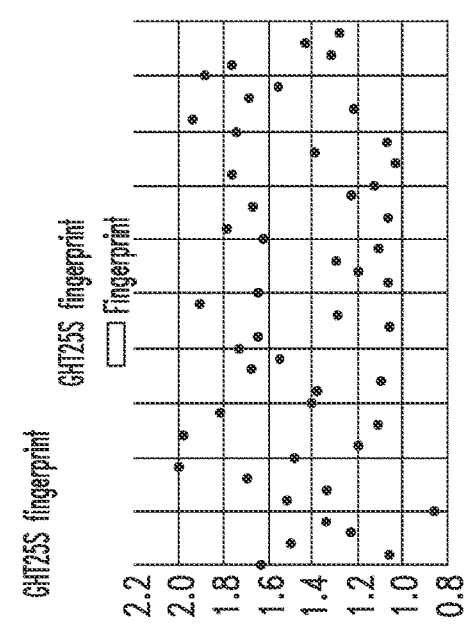
Figure 16B:
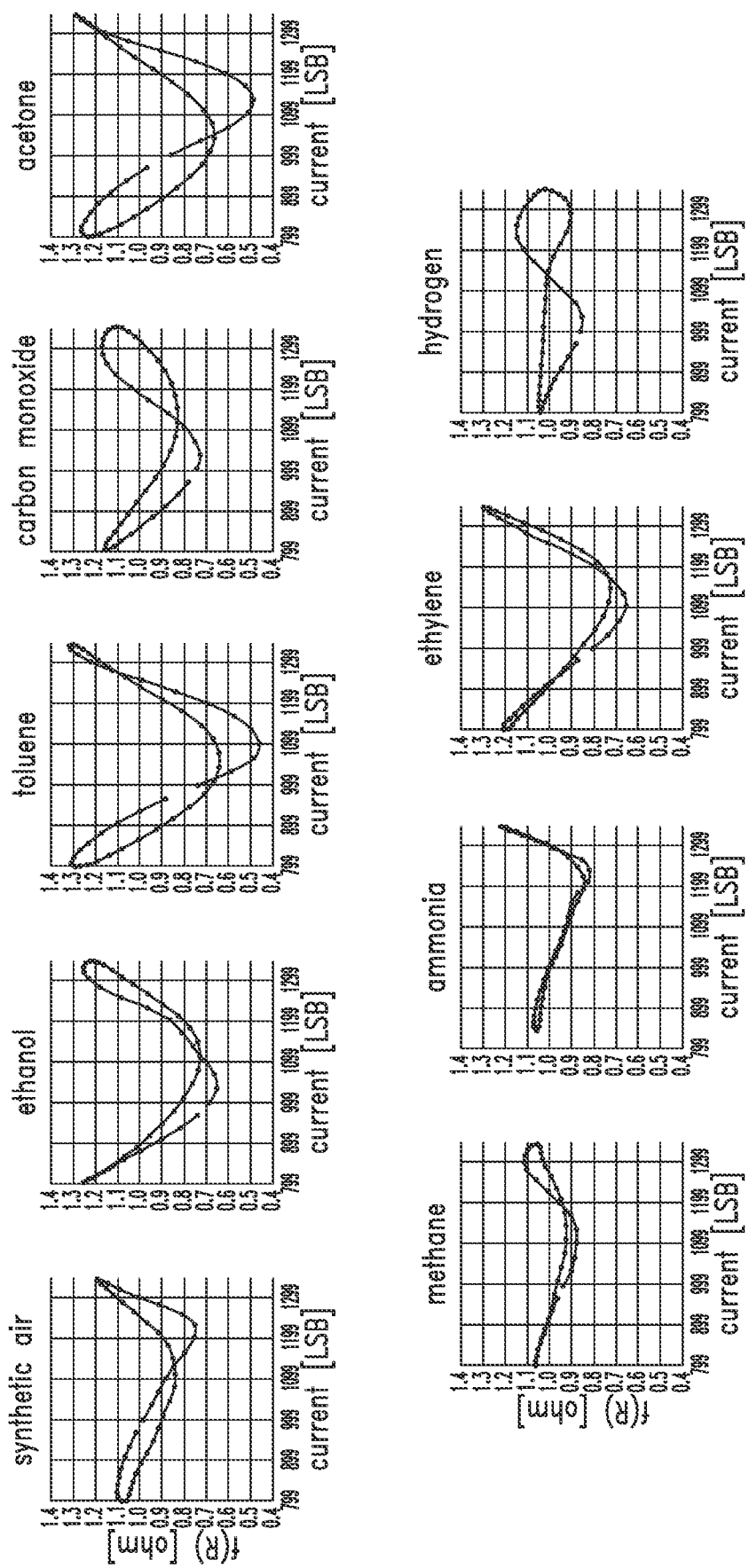

FIG. 13 is a conceptual diagram illustrating BEF, AEF, CBF and CAF functionality of providing gas sensor access as a service, and for convenience will be discussed with reference to FIG. 3. As illustrated, the BEF functionality includes generating raw data of the gas channel, and may be performed, for example, by the sensing elements 112 and the ASIC 114 of the sensor 310. The AEF functionality includes temperature and humidity compensation, ODR control and application of filters, and may be performed, for example, by the processing circuitry 336 of the Sensor 310. Authorization from the remote server 370, or tracking of the use of such services, may be performed in some embodiments. The CBF functionality includes AI classification of the sensor data (e.g., as indicating a particular gas as a particular concentration level), and may be performed by the symbiotic sensor 372, with the results provided by the sensor 310 to the host 150. The CAF functionality includes an AI toolbox (e.g., forming a gas library for AI classification of gas data, see, e.g., FIGS. 14 and 15), a dashboard for data monitoring (e.g., in real time; notifications; updates, etc., see, e.g., FIG. 16); cooperative algorithms for detecting outliers; gas-sensor diagnosis (e.g., control of self-diagnosis; providing of test data, etc.), and may be performed the symbiotic sensor in combination with the SaaS management circuitry, and in coordination with the sensor 310. As discussed above, FIGS. 14 and 15 are conceptual diagrams illustrating example data of an AI gas classification library, and FIG. 16 illustrates an example dashboard that may be employed to facilitate cloud management of a SaaS system. For example, controlling ANN selectivity, updates, etc., in a cloud dashboard.

Figure 17:
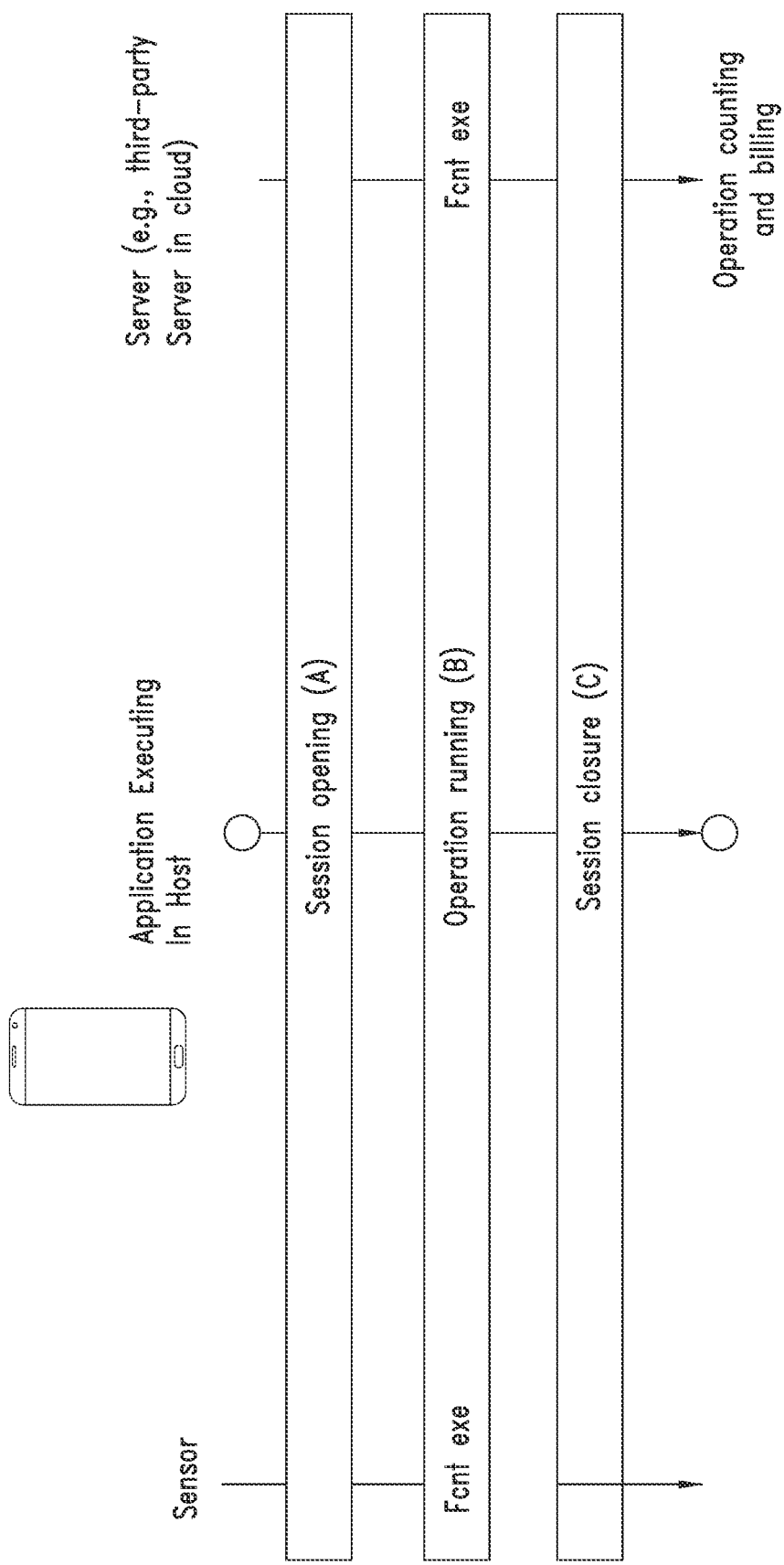
FIGS. 17 to 24 are example timing diagrams illustrating functions performed by and communications between a sensor, a host and a remote server of a system providing sensor access as a service in various embodiments.

FIGS. 17 to 21 are example timing diagrams illustrating functionality and communications between a sensor, a host and a remote server of an embodiment. In FIG. 17, an example session is illustrated. The session is opened by an application providing an API key to a sensor, which works with the server to open the session. While the session is running, functionality for the session is provided by the sensor and the server, for example, by executing routines and algorithms to provide the desired functionality (e.g., generating and processing or sensor data and corresponding results). When the session closes, the server tracks usage of the service, e.g., for control and billing purposes.

Figure 18:
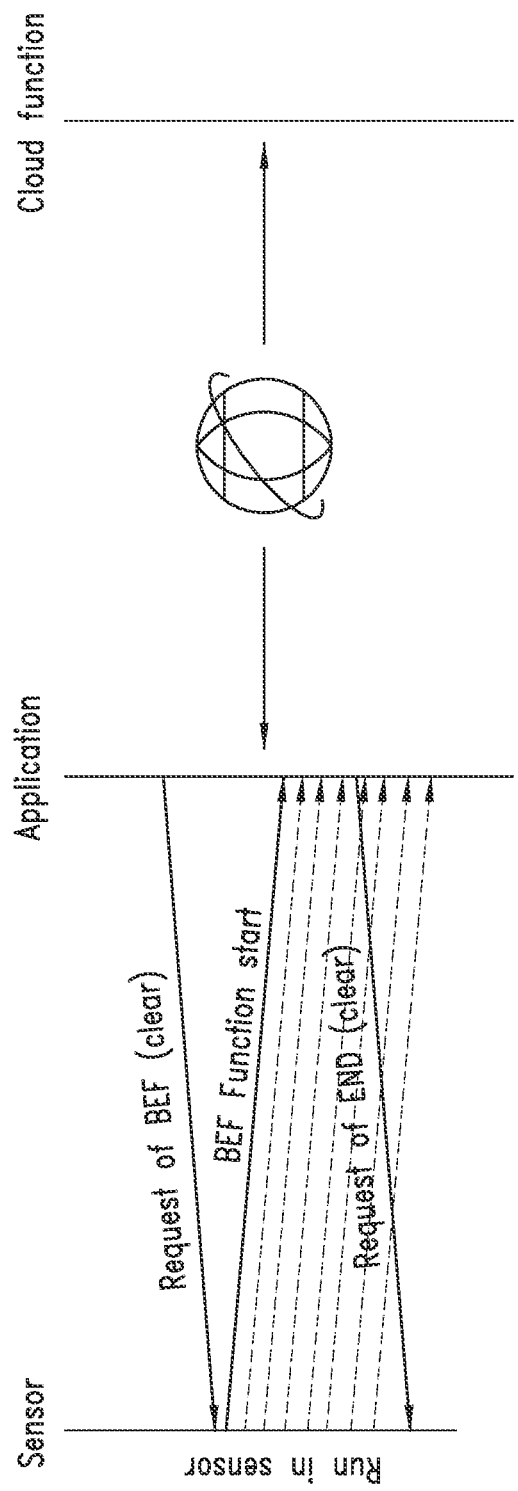

FIG. 18 illustrates an example timing diagram associated with BEF functionality. In the example of FIG. 18, BEF functionality may be provided in a conventional manner, with an application executing on a host processor communicating with the sensor in clear, without involving communication with the remote or cloud server. In some embodiments, BEF functionality usage may be reported and/or authorized using communication with the remote server.

Figure 19:
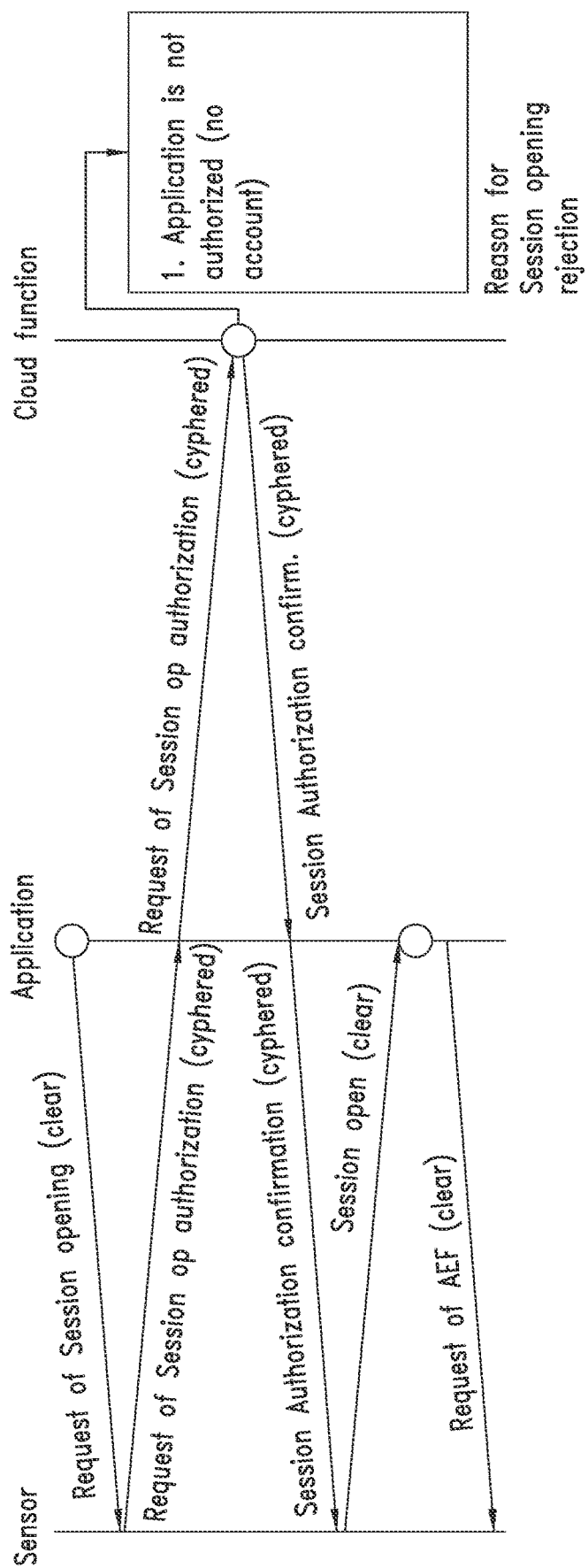

FIG. 19 illustrates an example timing diagram associated with functionality which in an embodiment requires opening of a session between a sensor and a remote or cloud server as part of providing SaaS service (e.g., AEF, BCF, ACF such as ODR control, FIFO control, offline data storage, filtering, interrupts, additional sensing for multi-sensor systems, etc.). As illustrated, an application executing on a host device requests a session in clear from a sensor (and may include an API key in the request). In response, the sensor generates an encrypted request asking for authorization of a session, and sends the encrypted request to a remote server (e.g., through a link established via the host device). The remote server determines whether the application is authorized to receive the requested services (e.g., based on an API key associated with the request).

Figure 24:
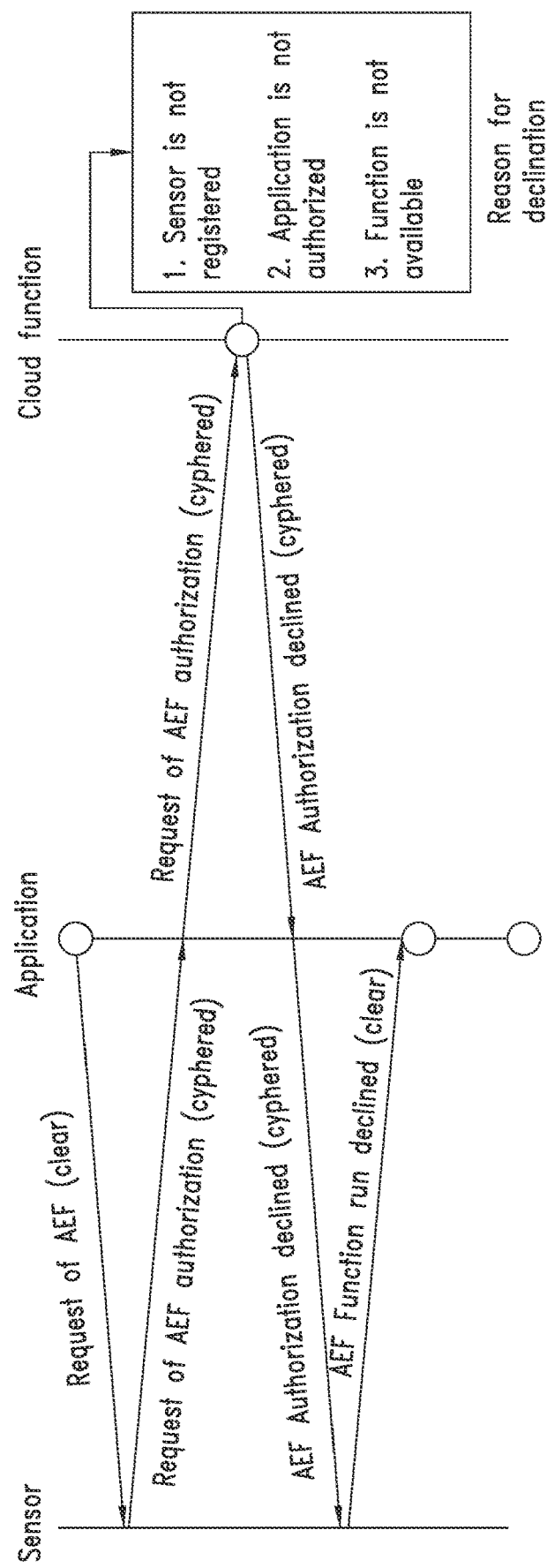

When the remote server determines the application is authorized to receive the requested services, the server sends an encrypted authorization confirmation to the sensor. The sensor responds to receipt of the authorization message by sending a session open message in clear to the application. In response, the application sends a service request (e.g., an AEF request), in clear to the sensor. If the application is not authorized (e.g., there is no account associated with the application) or for another reason the session is not authorized at the time of the request (e.g., the sensor has expired or needs updating, etc.), a session authorization confirmation is not sent. As shown in FIG. 24, error processing may occur.

For example, an encrypted authorization declined message, which may indicate a reason for the rejection, is sent to the sensor instead of an encrypted authorization confirmation. The sensor may indicate the rejection to the application in clear, possibly including a reason for the rejection.

Figure 20:
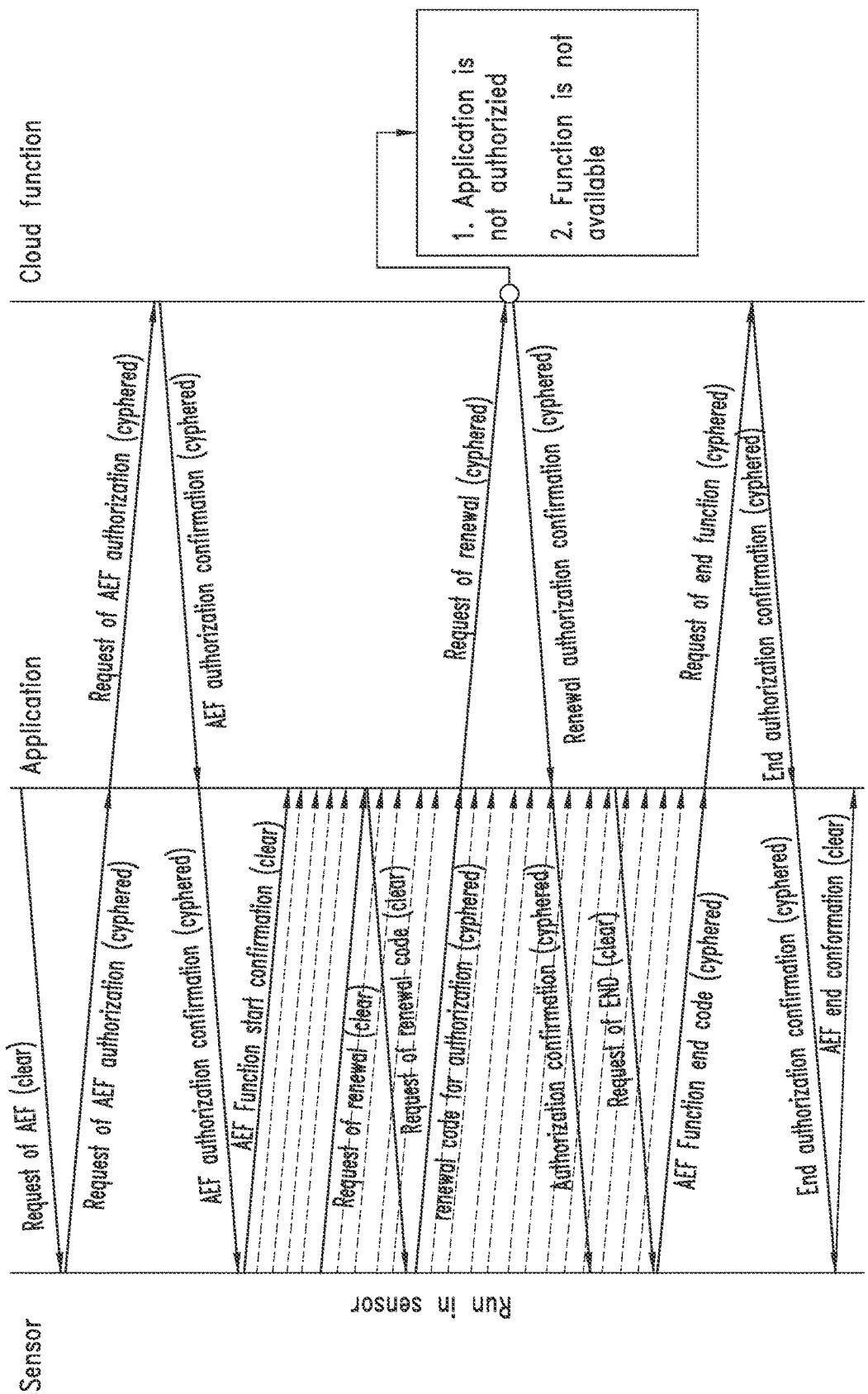

FIG. 20 illustrates an example timing diagram associated with providing AEF functionality as part of providing SaaS service. As illustrated, a session is opened, as discussed above with reference to FIG. 19. Dashed message lines indicate the providing of AEF functionality by the sensor to the application. The sensor or the remote server may initiate a renewal of the session authorization, for example, periodically, and the application may send a request to end the session, as shown by the solid message lines. Messages may be exchanged to confirm closure of the session. As noted above, error processing may occur, for example, as part of opening, closing or renewing a session.

Figure 21:
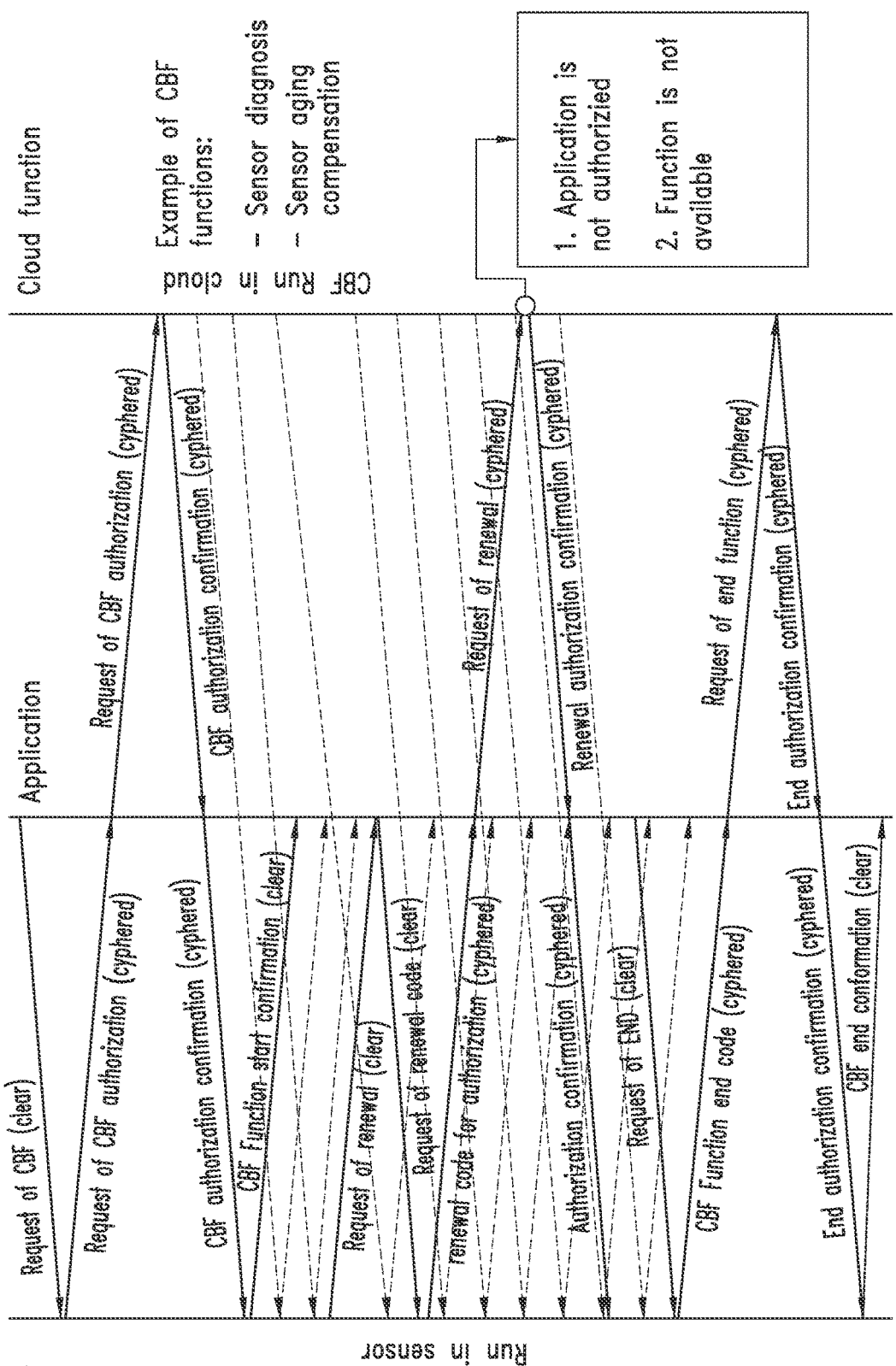

FIG. 21 illustrates an example timing diagram associated with providing CBF functionality as part of providing SaaS service. As illustrated, a session is opened, as discussed above with reference to FIG. 19. Dashed message lines indicate the providing of CBF functionality by the remote server to the application, with messages between the sensor and the server being encrypted and the sensor providing results in clear to the application. The sensor or the remote server may initiate a renewal of the session authorization, for example, periodically, and the application may send a request to end the session, as shown by the solid message lines. Message may be exchanged to confirm closure of the session. As noted above, error processing may occur, for example as part of opening, renewing or closing a session.

Figure 22:
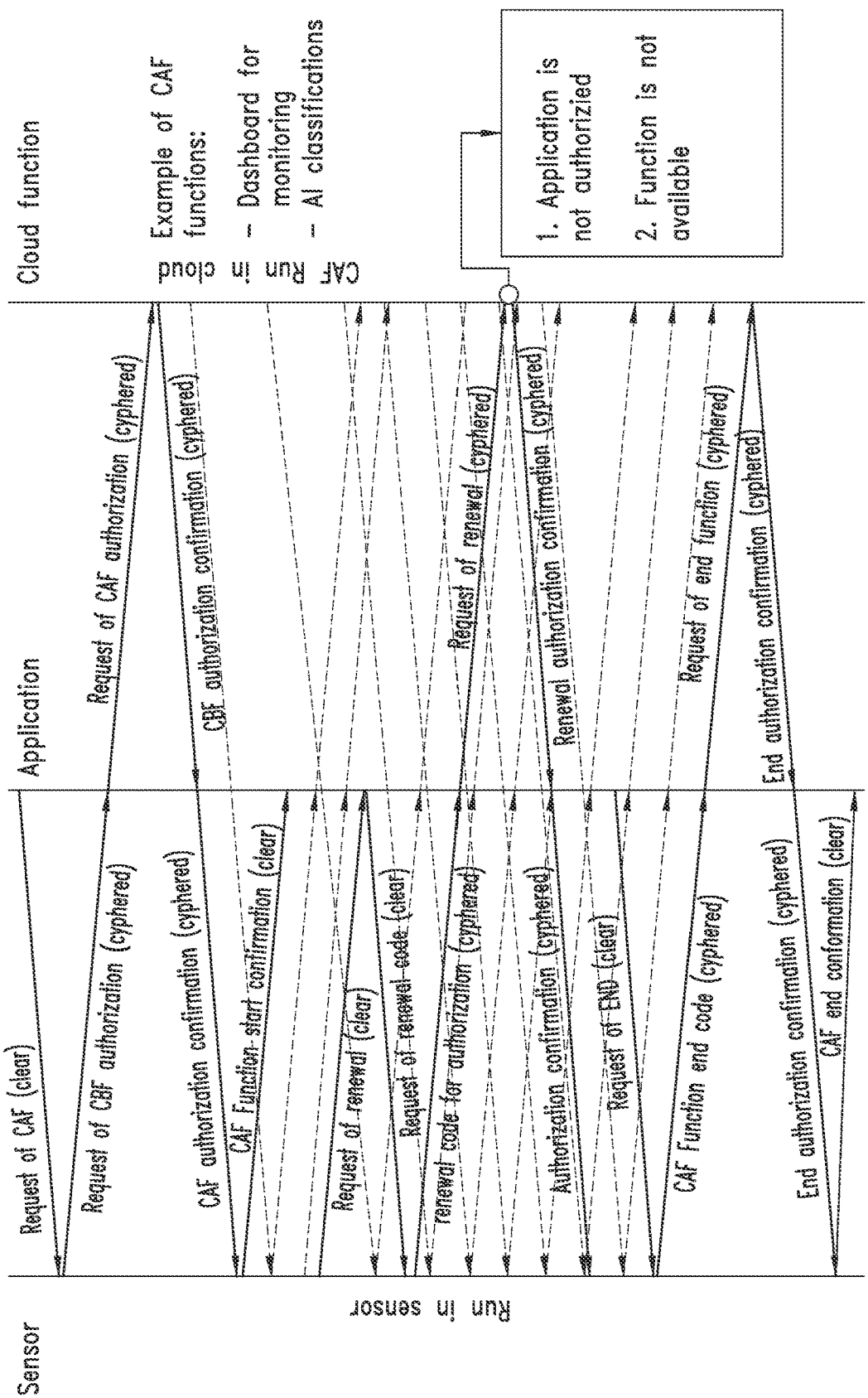

FIG. 22 illustrates an example timing diagram associated with providing CAF functionality as part of providing SaaS service. As illustrated, a session is opened, as discussed above with reference to FIG. 19. Dashed message lines indicate the providing of CAF functionality by the remote server to the application, with messages between the sensor and the server being encrypted and the sensor providing results in clear to the application. The sensor or the remote server may initiate a renewal of the session authorization, for example, periodically, and the application may send a request to end the session, as shown by the solid message lines. Message may be exchanged to confirm closure of the session. As noted above, error processing may occur, for example, as part of opening, renewing or closing a session.

Figure 23:
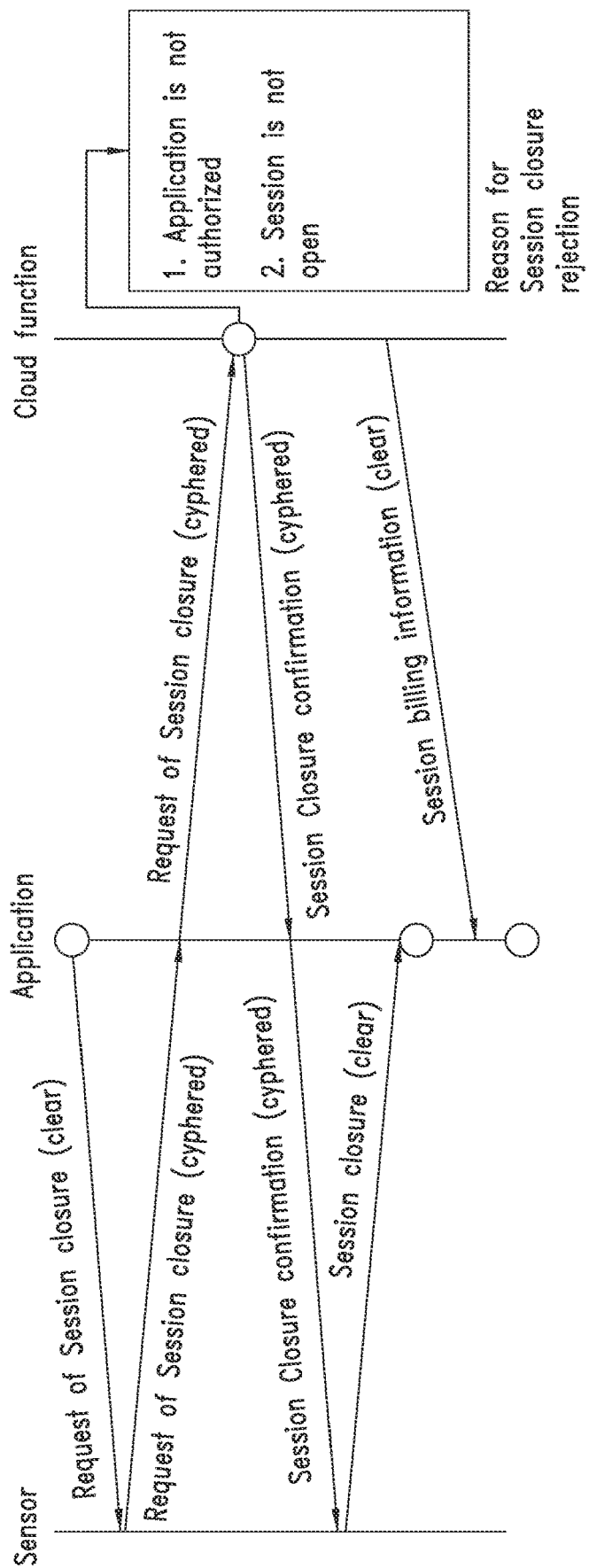

FIG. 23 illustrates an example timing diagram associated with the closing of a session between a sensor and a remote or cloud server as part of providing SaaS service (e.g., AEF, BCF, ACF such as ODR control, FIFO control, offline data storage, filtering, interrupts, additional sensing for multi-sensor systems, etc.) to an application executing on a host. As illustrated, an application executing on a host device requests a session closure in clear from a sensor (and may include an API key in the request). In response, the sensor generates an encrypted request asking for closure of a session, and sends the encrypted request to a remote server (e.g., through a link established via the host device). The remote server determines whether the application is authorized to close the session (e.g., based on an API key associated with the request), and if so, sends a closure confirmation to the sensor.

If the application is not authorized (e.g., there is no account associated with the application) or for another reason the application is not authorized at the time of to close the session (e.g., the application is associated with a different sensor), a session closure confirmation is not sent. Error processing may occur (e.g., an encrypted error message indicating a reason for the rejection may be sent to the sensor instead of an encrypted closure confirmation). The sensor may indicate the reason for the rejection to the application in clear. As illustrated, session tracking information (e.g., billing data), is sent to the application in clear.

Some embodiments may take the form of or comprise computer program products. For example, according to one embodiment there is provided a computer readable medium comprising a computer program adapted to perform one or more of the methods or functions described above. The medium may be a physical storage medium, such as for example a Read Only Memory (ROM) chip, or a disk such as a Digital Versatile Disk (DVD-ROM), Compact Disk (CD-ROM), a hard disk, a memory, a network, or a portable media article to be read by an appropriate drive or via an appropriate connection, including as encoded in one or more barcodes or other related codes stored on one or more such computer-readable mediums and being readable by an appropriate reader device.

Furthermore, in some embodiments, some or all of the methods and/or functionality may be implemented or provided in other manners, such as at least partially in firmware and/or hardware, including, but not limited to, one or more application-specific integrated circuits (ASICs), digital signal processors, discrete circuitry, logic gates, standard integrated circuits, controllers (e.g., by executing appropriate instructions, and including microcontrollers and/or embedded controllers), field-programmable gate arrays (FPGAs), complex programmable logic devices (CPLDs), etc., as well as devices that employ RFID technology, and various combinations thereof.

The various embodiments described above can be combined to provide further embodiments. Aspects of the embodiments can be modified, if necessary to employ concepts of the various embodiments and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A system, comprising:
a host processor, which in operation, executes an application that generates sensor-service-authorization requests and sensor-service requests; and
an integrated sensor device integrated into a chip and coupled to the host processor, the integrated sensor device including:
sensing circuitry integrated into the chip, wherein the sensing circuitry, in operation, generates sensor data related to one or more physical conditions;
processing circuitry integrated into the chip and coupled to the sensing circuitry, wherein the processing circuitry, in operation,
receives a sensor-service request in clear text from the host processor;
determines a type of a sensor-service request received from the host processor;
in response to determining the received sensor-service request is of a first type, generates results information in response to the sensor-service request of the first type based on generated sensor data and transmits the results information in clear text to the host processor; and
in response to determining the sensor-service request is of a second type:
initiates remote-server processing based on the sensor-service request of the second type, wherein the initiating comprises sending an encrypted communication from the integrated sensor device to the remote server via the host processor, without decrypting of the encrypted communication by the host processor; and
generates a response to the sensor-service request of the second type based on a response to the initiated remote-server processing; and
encryption circuitry integrated into the chip, wherein the encryption circuitry, in operation, encrypts communications from the integrated sensor device to the remote server and decrypts communications from the remote server to the integrated sensor device, wherein, in operation, the encrypted communications are transmitted between the integrated sensor device and the remote server via the application executing on the host processor.

2. The system of claim 1 wherein the processing circuitry, in operation, responds to a received sensor-service-authorization request by requesting remote-server verification that the application is authorized to receive sensor services.

3. The system of claim 2 wherein the processing circuitry, in operation, responds to a failure to receive verification that the application is authorized by denying access to sensor services to the application.

4. The system of claim 2, wherein authorizations of the application periodically expire and the processing circuitry, in operation, initiates remote-server reauthorization of the application in response to expiration of an authorization of the application.

5. The system of claim 2, wherein authorizations of the application periodically expire and the processing circuitry, in operation, initiates remote-server reauthorization of the application in anticipation of expiration of an authorization of the application.

6. The system of claim 1 wherein the first type of request comprises requests directed to functions embedded in the integrated sensor device.

7. The system of claim 6 wherein the functions embedded in the integrated sensor device include:
compensating for environmental factors;
initiating periodic remote-server reauthorization; or
combinations thereof.

8. The system of claim 1 wherein the second type of request comprises requests directed to cloud-based functionality.

9. The system of claim 8 wherein the cloud-based functionality includes:
sensor diagnostic functionality;
sensor aging compensation functionality;
sensor environmental factor compensation functionality;
dashboard functionality;
artificial intelligence classification based on sensor data;
artificial intelligence classification based on results information; or
combinations thereof.

10. The system of claim 9 wherein the environmental factors include temperature, pressure, illumination, sensor location, sensor position, sensor orientation, long-term sensor drift, or combinations thereof.

11. The system of claim 1, comprising a remote server, which, in operation, generates encrypted responses to the initiated remote-server processing.

12. The system of claim 11, wherein the integrated sensor device is a first integrated sensor device, comprising a second integrated sensor device, wherein the remote server, in operation, generates the encrypted response to the initiated remote-server processing based on sensor data generated by the first integrated sensor device and sensor data generated by the second integrated sensor device.

13. The system of claim 1 wherein the sensing circuitry includes a humidity sensor, a chemical sensor, a biochemical compound sensor, a radioisotope sensor, an infrared sensor, an air quality sensor, a water quality sensor, a thermal sensor, an organic compound detector, or combinations thereof.

14. An integrated sensor device, comprising:
sensing circuitry integrated into a chip, wherein the sensing circuitry, in operation, generates sensor data related to one or more physical conditions;
processing circuitry integrated into the chip and coupled to the sensing circuitry; and
encryption circuitry integrated into the chip, wherein
the processing circuitry, in operation, processes received sensor-session requests and received sensor-service requests of an application executing on a host processor, wherein the processing a received sensor-service request includes:
 receiving the sensor-service request in clear text from the host processor;
 determining a type of the received sensor-service request;
 in response to determining the received sensor-service request is of a first type:
  generating first results information in response to the received sensor-service request of the first type based on generated sensor data; and
  transmitting the first results information to the host processor in clear text; and
 in response to determining the received sensor-service request is of a second type:
  initiating remote-server processing based on the received sensor-service request of the second type, wherein the initiating comprises encrypting, by the encryption circuitry, a communication directed to a remote server, and sending the encrypted communication to the remote server via the host processor, without decrypting of the encrypted communication by the host processor;
  generating second results information in response to the received sensor-service request of the second type based on a received response to the initiated remote-server processing; and
  transmitting the second results information to the host processor in clear; and
the encryption circuitry, in operation, encrypts communications from the integrated sensor device to the remote server and decrypts communications from the remote server to the integrated sensor device to prevent access by the host processor to communications between the integrated sensor device and the remote server, wherein, in operation, the encrypted communications are transmitted between the integrated sensor device and the remote server via the application executing on the host processor.

15. The integrated sensor device of claim 14 wherein processing circuitry, in operation, responds to a received sensor-session request by requesting remote-server verification that an application associated with the received sensor-session request is authorized to receive sensor services.

16. The integrated sensor device of claim 15 wherein the processing circuitry, in operation, responds to a failure to receive verification that the application is authorized by denying sensor-service requests associated with the application.

17. The device of claim 15, wherein authorizations of the application periodically expire and the processing circuitry, in operation, initiates remote-server reauthorization of the application by sending an encrypted message to the remote server via the application.

18. The device of claim 17, wherein the method comprises initiating remote-server reauthorization of the application in response to or in anticipation of expiration of an authorization of the application.

19. The integrated sensor device of claim 14 wherein the first type of request comprises requests directed to functions embedded in the integrated sensor device.

20. The integrated sensor device of claim 19 wherein the functions embedded in the integrated sensor device include:
compensating for environmental factors;
initiating periodic remote-server reauthorization of an application associated with a service-request; or
combinations thereof.

21. The integrated sensor device of claim 14 wherein the second type of request comprises requests directed to cloud-based functionality.

22. The integrated sensor device of claim 21 wherein the cloud-based functionality includes:
sensor diagnostic functionality;
sensor aging compensation functionality;
sensor environmental factor compensation functionality;
dashboard functionality;
artificial intelligence classification based on sensor data;
artificial intelligence classification based on results information; or
combinations thereof.

23. The integrated sensor device of claim 14 wherein the sensing circuitry includes a humidity sensor, a chemical sensor, a biochemical compound sensor, a radioisotope sensor, an infrared sensor, an air quality sensor, a water quality sensor, a thermal sensor, an organic compound detector, or combinations thereof.

24. A method, comprising:
processing, using processing circuitry integrated into a sensing-device chip, sensor-session-authorization requests; and
processing, using the processing circuitry integrated into the sensing-device chip, sensor-service requests received from an application executing on a host processor, the received sensor-service requests including sensor service requests of a first type and sensor-service requests of a second type, wherein the processing of a received sensor-service request includes:
 receiving the sensor-service request in clear text from the host processor;
 determining a type of the received sensor-service request;
 in response to determining the received sensor-service request is of the first type, generating results information in response to the sensor-service request of the first type based on sensor data generated by sensing circuitry integrated into the sensing-device chip and transmitting the results information to the host processor in clear text; and in response to determining the received sensor-service request is of the second type:
    initiating remote-server processing based on the sensor-service request of the second type, the initiating remote-server processing including generating an encrypted message to the remote server, using encryption circuitry integrated into the sensing-device chip, and transmitting the encrypted message to the remote server via the application executing on the host processor without decrypting of the encrypted message by the host processor; and
    generating a response to the sensor-service request of the second type based on an encrypted response to the initiated remote-server processing received from the remote server via the application executing on the host processor, wherein the generating the response to the sensor-service request of the second type includes decrypting the encrypted response to the initiated remote-server processing using the encryption circuitry integrated into the sensing-device chip, wherein the encrypted communications are transmitted between the sensing-device chip and the remote server via the application executing on the host processor.

25. The method of claim 24 wherein processing a received sensor-service-authorization request comprises requesting remote-server verification that an application associated with the received sensor-service-authorization request is authorized to receive sensor services.

26. The method of claim 25, comprising initiating, using the processing circuitry, remote-server reauthorization of the application by generating an encrypted message and sending the encrypted message to the remote server via the application.

27. The method of claim 26, wherein authorizations of the application periodically expire and the method comprises initiating remote-server reauthorization of the application in response to or in anticipation of expiration of an authorization of the application.

28. The method of claim 24 wherein the received sensor-service request of the second type requests sensor-services providing:
    sensor diagnostic functionality;
    sensor aging compensation functionality;
    sensor environmental factor compensation functionality;
    dashboard functionality;
    artificial intelligence classification functionality based on sensor data;
    artificial intelligence classification functionality based on results information; or
    combinations thereof.

29. A non-transitory computer-readable medium having contents which configure processing circuitry of a sensing-device chip to perform a method, the method comprising:
    processing sensor-session-authorization requests; and
    processing sensor-service requests received from an application executing on a host processor, the received sensor-service requests including sensor service requests of a first type and sensor-service requests of a second type, wherein the processing of a received sensor-service request includes:
    receiving the sensor-service request in clear text from the host processor;
    determining a type of the received sensor-service request;
    in response to determining the received sensor-service request is of the first type, generating results information in response to the sensor-service request of the first type based on sensor data generated by sensing circuitry integrated into the sensing-device chip and transmitting the results information in clear text to the host processor; and
    in response to determining the received sensor-service request is of the second type:
        initiating remote-server processing based on the sensor-service request of the second type, the initiating remote-server processing including generating, using encryption circuitry integrated into the sensing-device chip, an encrypted message to the remote server and transmitting the encrypted message to the remote server via the application executing on the host processor without decrypting of the encrypted message by the host processor; and
        generating a response to the sensor-service request of the second type based on an encrypted response to the initiated remote-server processing received from the remote server via the application executing on the host processor, wherein the generating the response to the sensor-service request of the second type includes decrypting, using the encryption circuitry integrated into the sensing-device chip, the encrypted response to the initiated remote-server processing, wherein the encrypted communications are transmitted between the sensing-device chip and the remote server via the application executing on the host processor.

30. The non-transitory computer-readable medium of claim 29, wherein the contents comprise instructions, which when executed by the processing circuitry, cause the processing circuitry to perform the method.

31. The non-transitory computer-readable medium of claim 29, wherein the method comprises initiating, using the processing circuitry, remote-server reauthorization of the application by generating an encrypted message and sending the encrypted message to the remote server via the application.

32. The non-transitory computer-readable medium of claim 31, wherein authorizations of the application periodically expire and the method comprises initiating remote-server reauthorization of the application in response to or in anticipation of expiration of an authorization of the application.

* * * * *